US009971476B1

(12) United States Patent
Laukkanen et al.

(10) Patent No.: US 9,971,476 B1
(45) Date of Patent: *May 15, 2018

(54) SYSTEM AND METHOD FOR COOPERATIVE SHARING OF RESOURCES OF AN ENVIRONMENT

(71) Applicant: Chad Dustin Tillman, Matthews, NC (US)

(72) Inventors: Joona Laukkanen, Tampere (FI); Timo Eemeli Nummenmaa, Tampere (FI); Wouter Walmink, Amstenrade (NL); Alexander Rulkens, Amsterdam (NL); Erkki Antero Savilampi, Kangasala (FI)

( * ) Notice: Subject to any disclaimer, the term of this patent is extended or adjusted under 35 U.S.C. 154(b) by 501 days.

This patent is subject to a terminal disclaimer.

(21) Appl. No.: 14/743,055

(22) Filed: Jun. 18, 2015

Related U.S. Application Data

(63) Continuation of application No. 13/842,627, filed on Mar. 15, 2013, now Pat. No. 9,063,631.

(51) Int. Cl.
*G06F 3/0484* (2013.01)
*G06F 3/0482* (2013.01)

(52) U.S. Cl.
CPC ........ *G06F 3/0482* (2013.01); *G06F 3/04842* (2013.01)

(58) Field of Classification Search
CPC .................................................. G06F 3/04842
USPC ...................................................... 715/788
See application file for complete search history.

(56) References Cited

U.S. PATENT DOCUMENTS

| | | | | |
|---|---|---|---|---|
| 5,341,466 | A * | 8/1994 | Perlin | G06T 3/0025 345/428 |
| 7,383,291 | B2 * | 6/2008 | Guiheneuf | G06Q 10/06311 705/7.13 |
| 8,624,954 | B2 * | 1/2014 | Robinson | H04N 7/15 348/14.01 |
| 9,063,631 | B2 * | 6/2015 | Laukkanen | G06F 3/0481 |
| 2006/0010392 | A1 * | 1/2006 | Noel | G06F 3/0481 715/759 |
| 2006/0136828 | A1 * | 6/2006 | Asano | G06F 3/1454 715/733 |
| 2006/0168533 | A1 * | 7/2006 | Yip | G06Q 10/10 715/753 |
| 2007/0282793 | A1 * | 12/2007 | Majors | G06F 17/30861 |

(Continued)

OTHER PUBLICATIONS

U.S. Patent & Trademark Office Action dated Feb. 22, 2018, Examiner Dasgupta, issued in copending U.S. Appl. No. 14/848,325, pp. 1-28.

*Primary Examiner* — Reza Nabi
(74) *Attorney, Agent, or Firm* — Tillman Wright, PLLC; Chad D. Tillman; Jeremy C. Doerre

(57) ABSTRACT

A computer program product for providing a graphical user interface for displaying of and enabling cooperative use of resources on a display of a computing device includes computer readable code means, the computer readable code means when executed by a processor device, being configured to provide an environment, the environment being configured to represent the resources on the display of the computing device, provide a first viewport to at least a portion of the environment on the display of the computing device, enable a resource to be added to the environment and be viewed within the first viewport and enable the resource to be acted upon within the first viewport.

20 Claims, 18 Drawing Sheets

(56) References Cited

U.S. PATENT DOCUMENTS

| | | | | |
|---|---|---|---|---|
| 2008/0095151 A1* | 4/2008 | Kawazoe | G06F 3/1454 | 370/389 |
| 2010/0325559 A1 | 12/2010 | Westerinen | | |
| 2011/0074697 A1* | 3/2011 | Rapp | G06F 3/0481 | 345/173 |
| 2011/0191695 A1* | 8/2011 | Dinka | G06F 3/0481 | 715/753 |
| 2011/0239135 A1* | 9/2011 | Spataro | G06Q 10/10 | 715/753 |
| 2012/0011451 A1* | 1/2012 | Bansal | H04N 7/15 | 715/753 |
| 2012/0221959 A1* | 8/2012 | Bhogal | G06F 3/0483 | 715/740 |
| 2012/0274727 A1* | 11/2012 | Robinson | H04N 7/15 | 348/14.07 |
| 2012/0328163 A1 | 12/2012 | Panzer | | |
| 2013/0007895 A1* | 1/2013 | Brolley | G06F 21/62 | 726/28 |
| 2013/0054679 A1* | 2/2013 | Jooste | G06F 9/54 | 709/203 |
| 2013/0073980 A1* | 3/2013 | Amendolagine | G06F 3/0481 | 715/751 |
| 2013/0091440 A1* | 4/2013 | Kotler | G06Q 10/10 | 715/753 |
| 2013/0124090 A1* | 5/2013 | Gotschall | G01C 21/3664 | 701/533 |
| 2013/0169676 A1* | 7/2013 | Murtagh | G06T 15/503 | 345/629 |
| 2013/0246901 A1* | 9/2013 | Massand | G06F 17/24 | 715/229 |
| 2013/0290863 A1* | 10/2013 | Chen | G06F 3/0481 | 715/747 |
| 2014/0204873 A1* | 7/2014 | Junqua | H04W 4/02 | 370/329 |
| 2014/0280274 A1* | 9/2014 | Louis | G06F 17/3056 | 707/758 |
| 2014/0365923 A1* | 12/2014 | Lee | G06F 3/017 | 715/758 |
| 2015/0019694 A1* | 1/2015 | Feng | H04L 65/601 | 709/219 |

\* cited by examiner

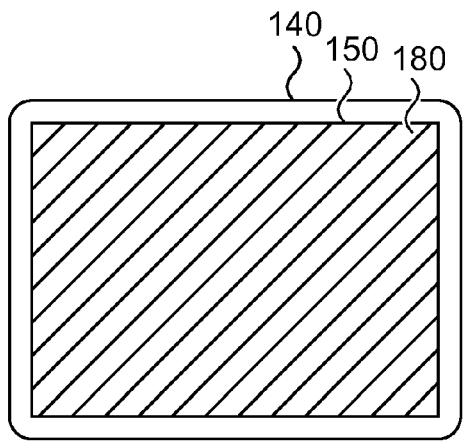
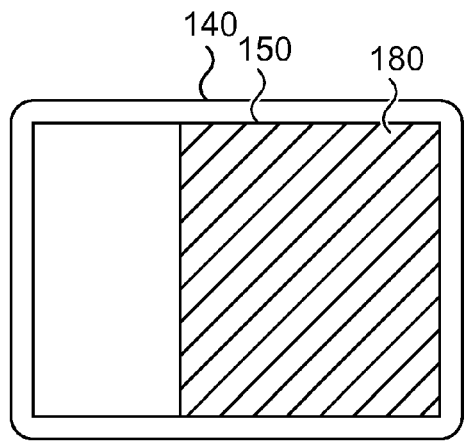
FIGURE 6  FIGURE 7
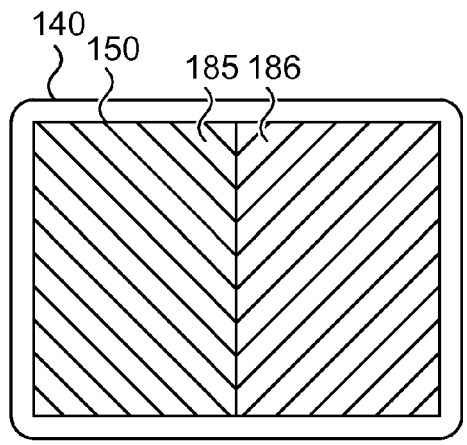
FIGURE 8
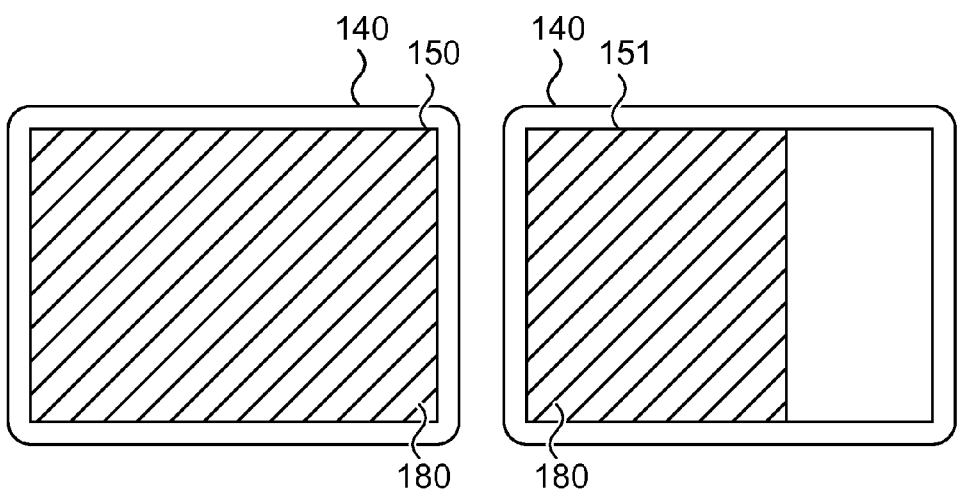
FIGURE 9

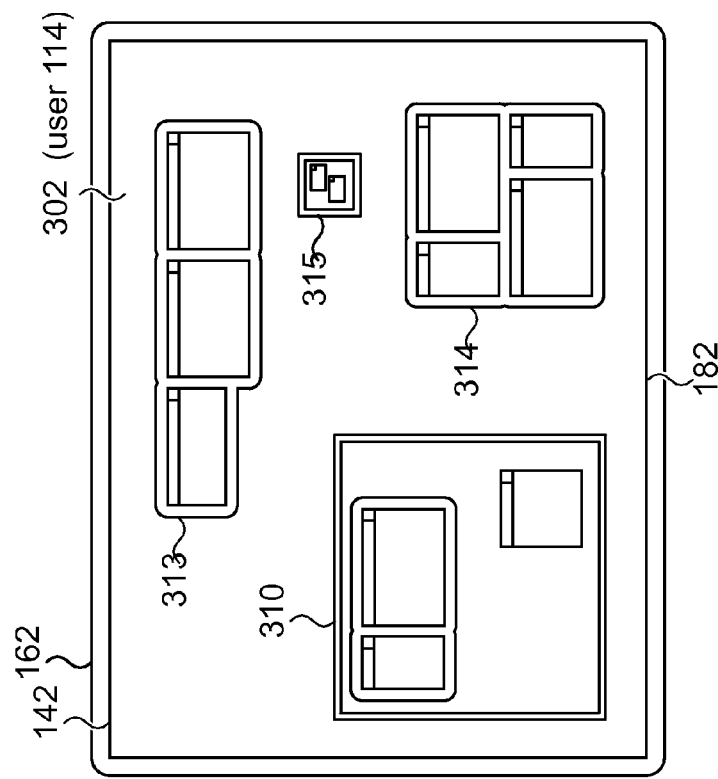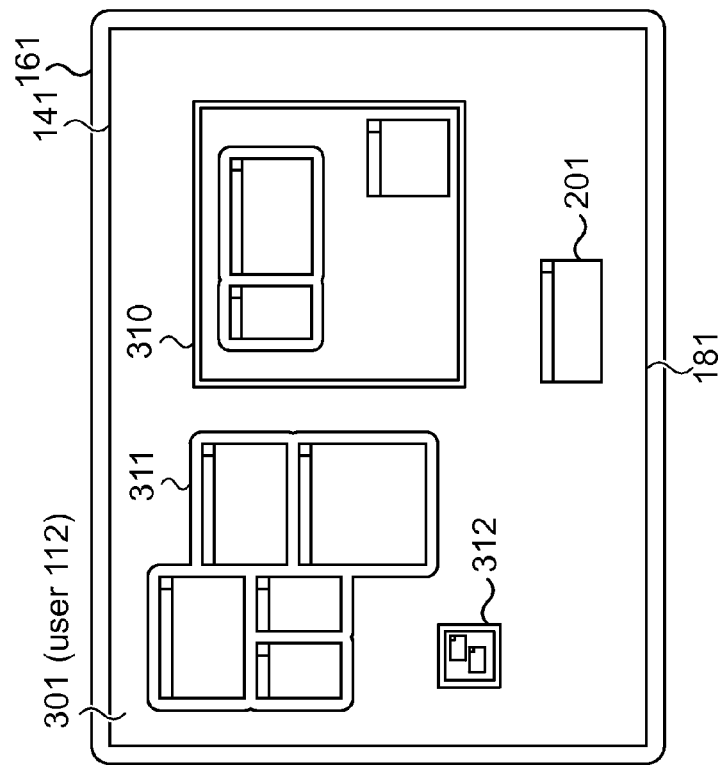
FIGURE 15

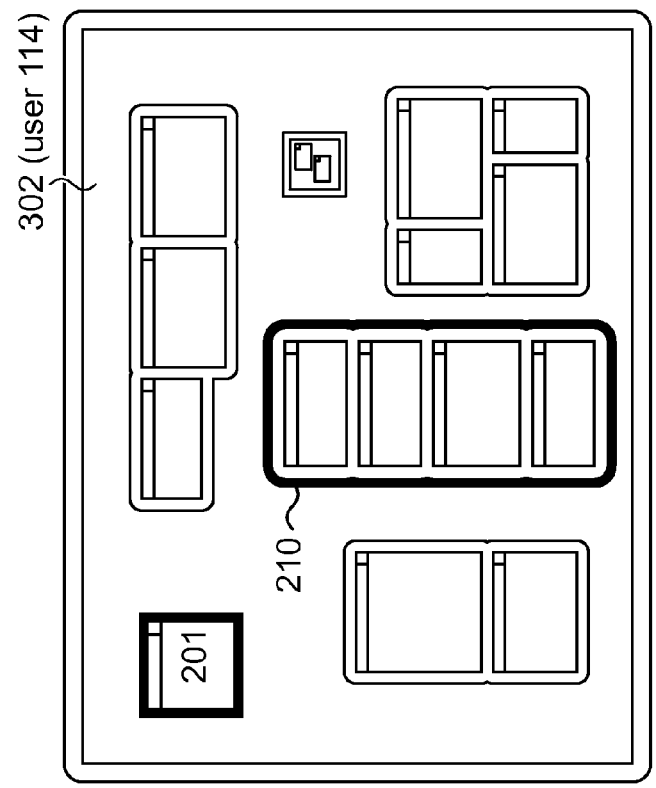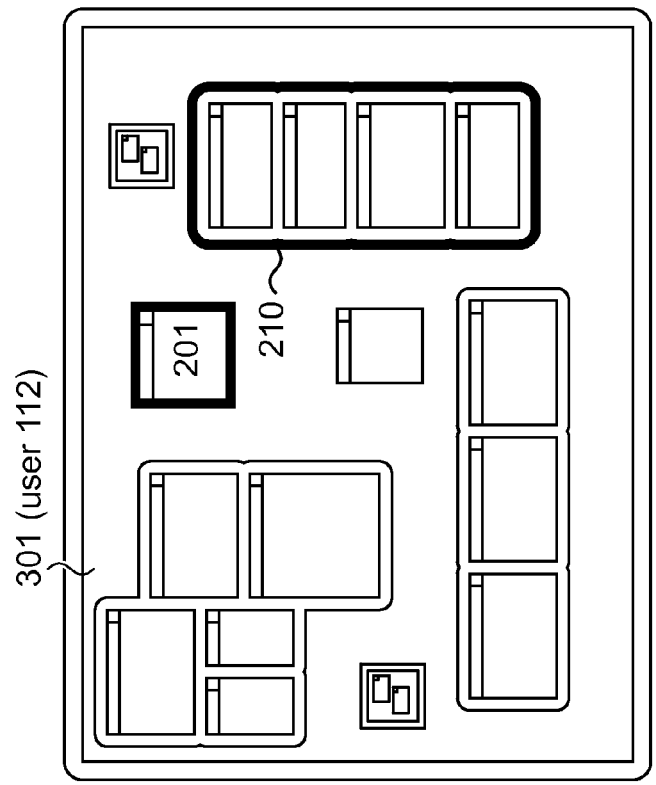
FIGURE 16

SYSTEM AND METHOD FOR COOPERATIVE SHARING OF RESOURCES OF AN ENVIRONMENT

CROSS-REFERENCE TO RELATED APPLICATION

The present application is a U.S. continuation patent application of, and claims priority under 35 U.S.C. § 120 to, U.S. nonprovisional patent application Ser. No. 13/842,627, filed Mar. 15, 2013, which nonprovisional patent application published as U.S. patent application publication 2014/0282229 A1 and granted on Jun. 23, 2015, as U.S. Pat. No. 9,063,631, which patent application, patent application publication, and patent are incorporated by reference herein.

BACKGROUND

The aspects of the present disclosure relate generally to systems that enable sharing of information between users of computing devices, and in particular to cooperative sharing of resources in a desktop environment, including applications, windows, files and information, among different users. Desktop sharing systems do not support multiple parties operating together so that the different parties having access to a shared desktop would be able to bring their own windows to the shared desktop. Also, windows appearing on top of other windows on the shared desktop will disable different parties from working with different windows at the same time if some of the relevant windows are occluded by others. These problems with desktop sharing systems disable multiple user cases where a user, who is currently not sharing his own desktop, would need to share one of his windows to the other parties e.g. because it contains valuable information to the other parties or where the parties would need to be able to collaborate or cooperate using a number of windows or applications. It would be advantageous to have a system where multiple users could share and/or interact with one or more windows or comparable resources, substantially simultaneously in the same desktop.

In some desktop sharing systems it is also difficult or even not possible to control and verify which windows on the desktop a guest user is allowed to see. This can be a problem in situations where a user would like to allow or enable a guest user, for example a technical support person, to see some but not all of the windows that are open and/or to verify which windows the guest user will be able to see. It would be advantageous to have a system that makes it possible and efficient to control and visually verify which windows are shared with a guest user.

Certain desktop sharing and windowing applications will support multiple users simultaneously sharing windows, generally referred to resources herein, that are presented on a desktop, with a fixed, limited size. However, in a workspace with a limited size it is difficult to establish a layout that the multiple users are comfortable working with, which can depend upon, for example visibility, accessibility and relative positioning of the resources on the desktop such that the positioning supports workflow. In order for two or more users to be able to work on different resources on the shared desktop, the resources generally need to occupy different regions of the available desktop space. This generally means that the individual dimensions of the different resources will have to be reduced to less than half of the available screen space to remain fully visible. It would be advantageous if multiple users working on different resources at the same time could do so without needing to limit the size of the resources and if even large numbers of resources could be laid out so that the layout of resources is comfortable for multiple users to work with.

For instance, in the aforementioned desktop sharing systems, it can also be difficult to maintain a layout where resources such as windows do not overlap, or establish layouts with spatially stable relationships between them. While increasing the size or display resolution of the physical display, or adding multiple monitors, may aim to address this problem, larger or additional monitors are generally not able to compensate for the increasing number of (active) resources on the desktop. If more windows are continually opened, the amount of open windows will eventually crowd the available display space. As a result, these systems typically allow users to work with only one window at a time, since allowing users to work with more than one window would cause space contention when two or more users try to use different windows that overlap on the desktop. It would be advantageous for multiple users to have access to a shared environment that contains more than one, or a number of resources, without having to negotiate their use of screen real estate.

Because users are customarily positioned substantially in front of their display device, in terms of viewing direction, users will tend to position their active windows approximately in the middle of the screen of the display device (horizontally) so that they do not have to turn their head or body to look at the window(s) they are working with. However, in the typical desktop sharing system, all users share the same view. This means that when two or more users are working on different resources on the shared desktop, it may not be possible or practical for every user to position the resource they are working on in the center region of the screen. It would be advantageous if all users could position the resource they are working on in the center region of the screen. The terms "screen", "display" or "display area" is generally intended to include the area of a display device that can be used to present resources, as is generally described herein.

In a multiple user environment, different users may be working on a shared set of resources, but they may not have a sense of a shared context of work or cooperation with other team members, which can make the coordination of activities difficult. For example, in systems where multiple users are working on a shared set of documents, but where the users work with the documents in the context of their own resources, the users will have minimal, if any, awareness of the working context of the other users. It would be advantageous for a user to be able to quickly see what shared resources other users are and have been using, as well as how those resources are and have been arranged, even when not actively being used by themselves.

Remote desktop systems are frequently used by computing device users to share a desktop between multiple devices. However, these systems suffer from the problem that because different devices are frequently used in different working contexts (e.g. work or home) where different windows will also frequently be used, the stacking order of windows will frequently change whenever the user switches between different devices. This will generally make transitioning between working contexts more difficult as the user will have to re-establish the working context whenever they switch between devices and working contexts. It would be advantageous to use different devices to access different windows in a single desktop without affecting the layout of windows in the shared desktop.

Windows usually overlap in desktop sharing systems and the layout or stacking order of windows can change when a window is activated, which can include a window getting focus or moving to the foreground. Thus, when a window is activated, also referred to as an active window, the layout or order of the other windows on the display relative to the active window, can change, potentially reducing visibility of window regions that were previously visible. Similarly, in desktop sharing systems, the creation of new windows can obstruct another user's view to other windows that they were working on as the new windows that have been created appear on top of other windows. It would be advantageous to have a desktop space in which resources do not have to overlap in order to fit in the desktop space, regardless of their sizes, but in which the resources can be arranged in a spatially stable and non-overlapping manner instead. Such a desktop space would: be easier for its users to navigate because they will be able to employ their spatial memory more effectively to locate specific resources in the desktop space; allow its users to work with windows that cover much of the display area without losing context of work; and support more efficient cooperation between multiple users as users' resources can be arranged so that they will not be occluded by other users' resources.

In many traditional systems such as the MICROSOFT WINDOWS 7™ operating system windows can be minimized, which hides the window in the taskbar. In these systems, minimizing is a frequent operation performed to hide items not needed anymore or when a user thinks that a window is on the way. This can be problematic in a multi-user context where minimizing a window may have adverse effect on other users who may want to continue working with the window. It would be advantageous to have a system in which windows that a user is working on will not be frequently hidden by activities of another user.

Instant messaging systems, chat rooms and other communication systems such as the channels on Internet Relay Chat (IRC) or Skype™ are frequently used for cooperation and collaboration. One of the limitations of such systems is that the participating users will generally have their own, individual copies of the resources being worked on. As an example, it is common that participants post links or documents that each participant will have to open separately to access some resource that is to be shared between the participants. It is also possible that the links to documents will scroll in the window with more text entries being introduced in the window so that the user may have to scroll the chat window to locate the address or link that will open the shared resource. This is inconvenient for the sender, who might first have to make some resource (e.g. a snippet of programming code) available online and then separately post the URL to that resource to others in the chat room, and after which may not be able to effectively monitor who actually looks at the resource. This can also be inconvenient for the respondents who have to download or open the document to see what the sender wants them to see. It would be advantageous for different parties to be able to share live resources in a shared space so anyone with access rights in the environment can access and interact with it effortlessly.

Certain social systems allow users to promote a resource by, for example "liking" a resource. However, this requires explicit action on part of the user and it may not be possible to monitor interest in an activity on a resource, e.g. visits or the amount of time spent on the resource by users, actively as the resource is accessed or acted upon. For instance, it may be difficult for a FACEBOOK™ user to see what shared resources their friends, currently also logged in to FACE-BOOK, are viewing or acting upon. It would be advantageous for a user to be able to directly observe it when a resource is accessed, visited, spent time on, or acted upon, and to provide an indication of the amount of interest in or activity on a resource, to the user.

In a desktop type of sharing solution, the space is shared actively by the host. When the host quits, the session is terminated. It would be advantageous to be able to use a server to host a session that does not terminate or to have a distributed session that does not end until all the users have quit.

Accordingly, it would be desirable to provide a system that addresses at least some of the problems identified above.

SUMMARY

As described herein, the exemplary embodiments overcome one or more of the above or other disadvantages known in the art.

One aspect of the present disclosure relates to a computer program product for providing a graphical user interface for displaying of, and enabling cooperative use of resources on a display of a computing device. In one embodiment, the computer program product includes computer readable code means, the computer readable code means when executed by a processor device, being configured to provide a desktop environment, the desktop environment being configured to represent the resources on the display of the computing device; provide a first viewport to at least a portion of the desktop environment on the display of the computing device; enable a resource to be added to the desktop environment and be viewed within the first viewport; and enable the resource to be acted upon within the first viewport.

Another aspect of the present disclosure relates to a method for providing a graphical user interface for displaying and enabling cooperation with resources on a display of a computing device. In one embodiment, the method includes providing a desktop environment, the desktop environment being configured to represent the resources on the display of the computing device; providing a first viewport to at least a portion of the desktop environment on the display of the computing device; enabling a resource to be added to the desktop environment and be viewed within the first viewport; and enabling the resource to be acted upon within the first viewport.

A further aspect of the disclosed embodiments is directed to a display device for displaying and enabling cooperation with resources. In one embodiment, the display device includes a user interface; and a controller in communication with the user interface, the controller having a memory including programming instructions that when executed by a processor are configured to cause the controller to provide a desktop environment; provide one or more viewports to the desktop environment; enable one or more resources to be added to the desktop environment, the viewport providing a gateway to the resources that enables interaction with the resources through the user interface; and enable selection of a resource within a viewport to bring the selected resource to a forefront of the user interface.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

In the drawings:

FIGS. 6-11 illustrates examples of configurations of an exemplary viewport incorporating aspects of the present disclosure.

FIG. 15 illustrates another embodiment of sharing a desktop environment in a system incorporating aspects of the present disclosure.

FIG. 16 illustrates one embodiment of sharing resources in a system incorporating aspects of the present disclosure.

DETAILED DESCRIPTION OF THE DISCLOSED EMBODIMENTS

Figure 1:
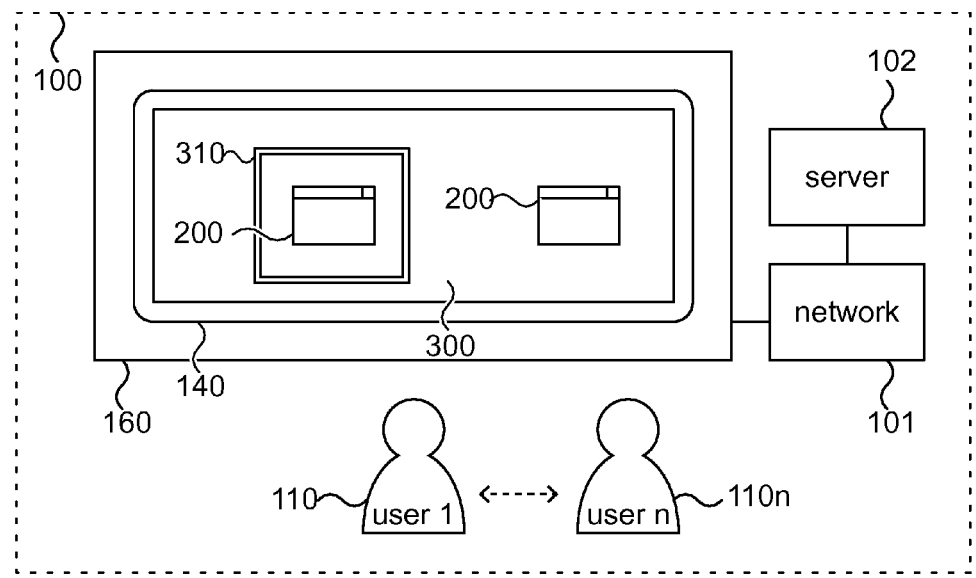
FIG. 1 illustrates a schematic block diagram of one embodiment of a system incorporating aspects of the present disclosure.

Referring now to FIG. 1, one embodiment of a system 100 incorporating aspects of the disclosed embodiments is illustrated. The aspects of the present disclosure are generally directed to a multi-user computing environment, where there is a cooperative or collaborative sharing of resources, files and information between and among multiple users. Users are provided with one or more viewports through which they can observe resources in a desktop environment, zoom into and out from specific resources, as well as interact with those resources.

The term "resource" as is used herein, generally refers to any object or item, groups of objects or items, or any combination thereof, which can be placed and arranged on or in a desktop environment. Examples of "resources" can include, but are not limited to, application windows, or any visual output or indication of an application that provides the user with some type of user interface (which may or may not be interactive) to that or another application. Resources can also include, for example, web documents and resources. "Environment" is intended to include a large, theoretically infinite, space according to the desktop metaphor, in which "resources" can be arranged. In one embodiment, the extent or size of the environment is defined substantially by the size of an area within which the resources in that environment reside. One example of an "environment" is the desktop space of a computer, generally referred to herein as the desktop environment.

In accordance with the aspects of the disclosed embodiments, the resources can be accessed using different computing devices. The aspects of the disclosed embodiments advantageously support effective cooperation around or involving use of resources between users. The terms "cooperation", "cooperative" and "collaboration" as used herein, are generally intended to include any form of related activity by multiple parties e.g. for personal or group benefit, in any context, e.g. private or work.

FIG. 1 illustrates a block diagram of one embodiment of the system 100. In this example, the system 100 includes a desktop environment 300 that is presented on a display or display device 140. Although only a single desktop environment 300 is shown in this example, in alternate embodiments, any suitable number of desktop environments 300 can be provided on the display device 140, including more or less than one. The display device 140 in this example can include any suitable display that is coupled to, or part of, a computing device or system 160. Although for the purposes of the description herein the display device 140 will be shown as part of the computing device 160, the aspects of the disclosed embodiments are not so limited, and the display device 140 can be a separate component from, and is communicatively coupled to, the computing device 160. Examples of such computing devices or systems 160 can include, but are not limited to, a computer, personal computer, mobile communication device, tablet or touch screen device. In this example, the display device 140 can be referred to as a monitor. In one embodiment, the computing device 160 can be connected to a network 101, such as the Internet for example, as well as a server 102 to enable communication and cooperation with other users 110n, the user 110n also have a computing device 160, such as that shown in FIG. 1.

In the example of FIG. 1, the environment 300 includes one or more resources, generally indicated by reference 200. While for the purposes of the description herein, the same reference number 200 will be used to indicate resources generally, the numbering does not imply that resources 200 are the same resources. Rather, it will be understood that the resources 200 can comprise different and individual resources, commensurate with the definition of resources herein. In this example, the resource 200 is an application window, although in alternate embodiments, the resource 200 can comprise any suitable resource as is otherwise described herein. Although only one resource 200 is referred to in this example, in alternate embodiments, any suitable number of resources can be provided in the environment 300. In one embodiment, resources 200 may appear differently through different viewports 180. For example, within the viewport 180 of one user a web resource 200 such as a web page may appear in a Firefox™ browser window and within the viewport 180 of another user the same resource 200 may appear inside an Opera™ browser window. As another example, an application window to a text document could appear differently through viewports of different users so that the different users are able to see and interact with different parts of the text document.

In one embodiment, the desktop environment 300 can include another desktop environment 300, or desktop sub environment 310, generally referred to herein as a "sub-environment." Although only one other sub-environment 310 is shown in this example, in alternate embodiments, any suitable number of other sub-environments 310 within the desktop environment 300 can be provided. As shown in FIG. 1, the desktop environment 300 includes a resource 200. Although the resource 200 in FIG. 1 is shown in the form of an application window, it will be understood that the resource 200 can include any suitable resource, as is otherwise defined herein.

Figure 2:
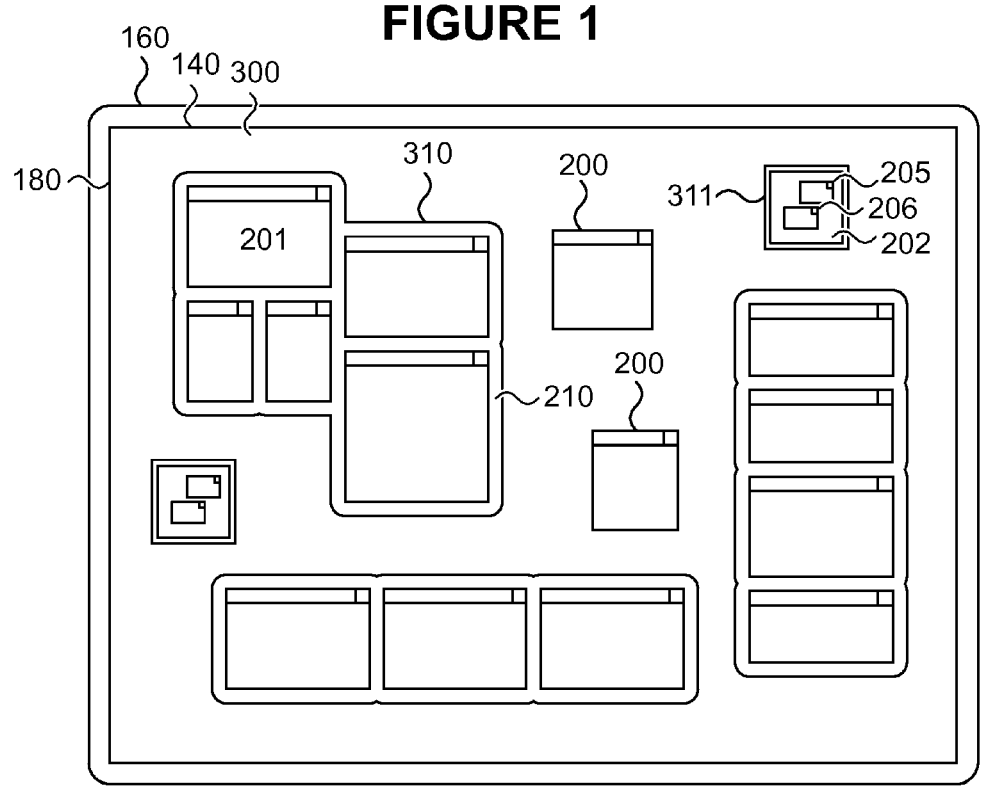
FIG. 2 illustrates one embodiment of an exemplary arrangement of desktop environments and resources within a desktop environment, in accordance with the aspects of the present disclosure.

FIG. 2 illustrates one embodiment of an exemplary arrangement of desktop sub environments 310 and resources 200 within desktop environment 300, in accordance with the aspects of the present disclosure. In this example, the sub environments 310 include one or more resources 200, or groups 202 of resources 200.

As noted with respect to FIG. 1, the resources 200 arranged in desktop environment 300 are configured to be shared between more than one user 110. In order to share resources 200, the aspects of the disclosed embodiments provide a viewport 180. A viewport 180, as that term is generally used herein, provides a view to at least a portion of the desktop environment 300 in the example of FIG. 2. In the example shown in FIG. 2, the viewport 180 provides a view to the portion of the environment 300 including a number of resources 200. In alternate embodiments, the viewport 180 can be configured to show more or less of the environment 300.

Figure 3:
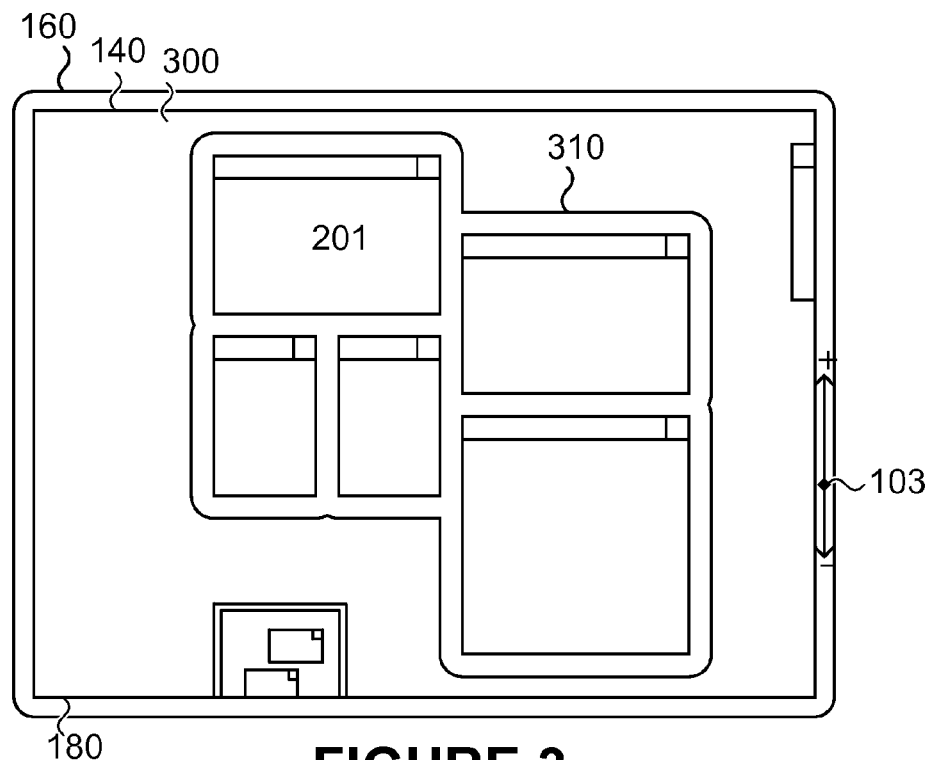
FIG. 3 illustrates a zoomed-in view of the arrangement illustrated in FIG. 2.
Figure 4:
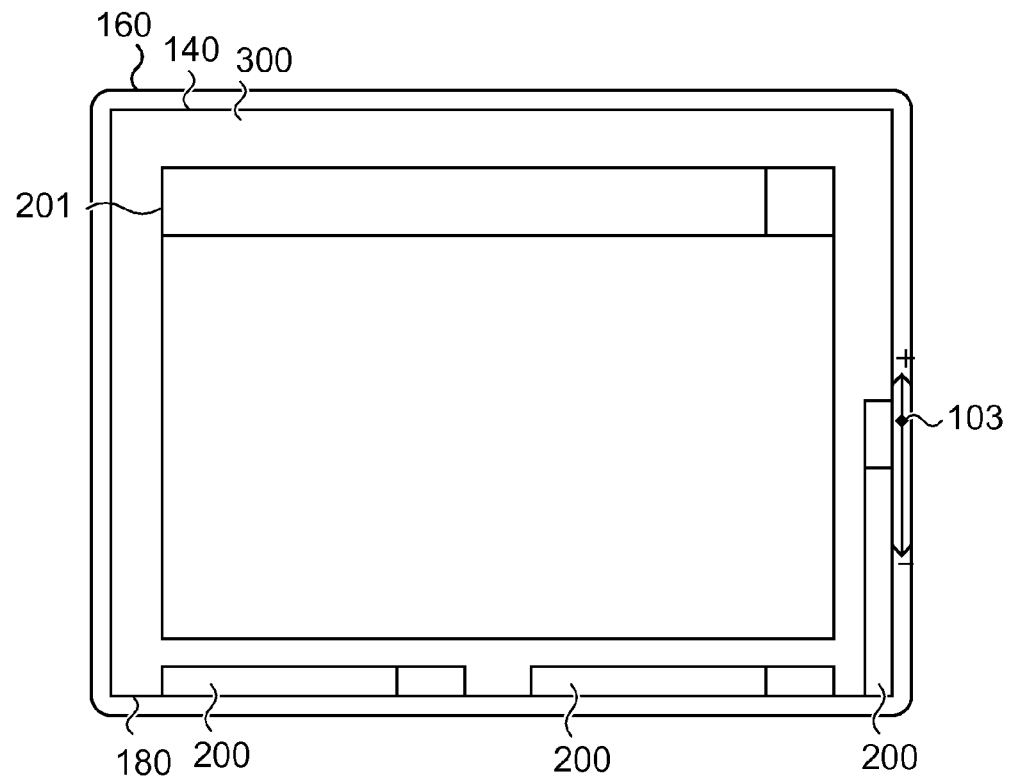
FIG. 4 illustrates a zoomed-in view of the arrangement illustrated in FIG. 3.

In one embodiment, referring to FIGS. 2-4, the user 110 can navigate the desktop environment 300 by panning, zooming, or otherwise adjusting the region of the environment 300 seen through the viewport 180. The viewport 180 can also be used to zoom into and out from specific resources in the environment 310. The resources 200 within the view of the viewport 180 can also be interacted with, through the viewport 180. In one embodiment, the user 110 can zoom in directly on specific resources 200 in the environment 300 by "clicking", as that term is generally understood, on a specific resource 200, when the resource is not shown in full scale on the display device 140. For example, referring to FIGS. 2 and 3, in one embodiment, clicking on resource 201 in the viewport 180 of FIG. 2, will result in the zoomed-in view shown in FIG. 3.

Clicking on resource 201 in the view shown in FIG. 3 will zoom-in further on resource 201, as is shown in the view presented in FIG. 4. In FIG. 4, a zoomed-in view of the environment 300 illustrated in FIG. 3 is shown, with more focus on resource 201, meaning that a larger area of the resource 201 is shown compared to other resources 200. Similarly, the aspects of the disclosed embodiments enable utilizing the viewport 180 to zoom-out of the environment 300, meaning that more resources 200 will be brought into the focus or field of view of the viewport 180. In one embodiment, a scale or zoom adjustment device 103 can be provided to allow scaling the zoom view or magnification feature. The adjustment device 103 can be provided inside the viewport 180 as shown in FIG. 4, or the adjustment device 103 can also be external to the viewport 180. Examples of such zoom adjustment devices 103 are generally known, and can include for example, but are not limited to, plus and minus size indicators, an up/down scale or size adjustor, or zoom-in, zoom-out buttons, for example. Various interactions and user input elements can be used to manipulate the zoom or scale, including for example, touch and user gestures or input devices and methods such as a mouse, keyboard, pen and stylus.

Figure 5:
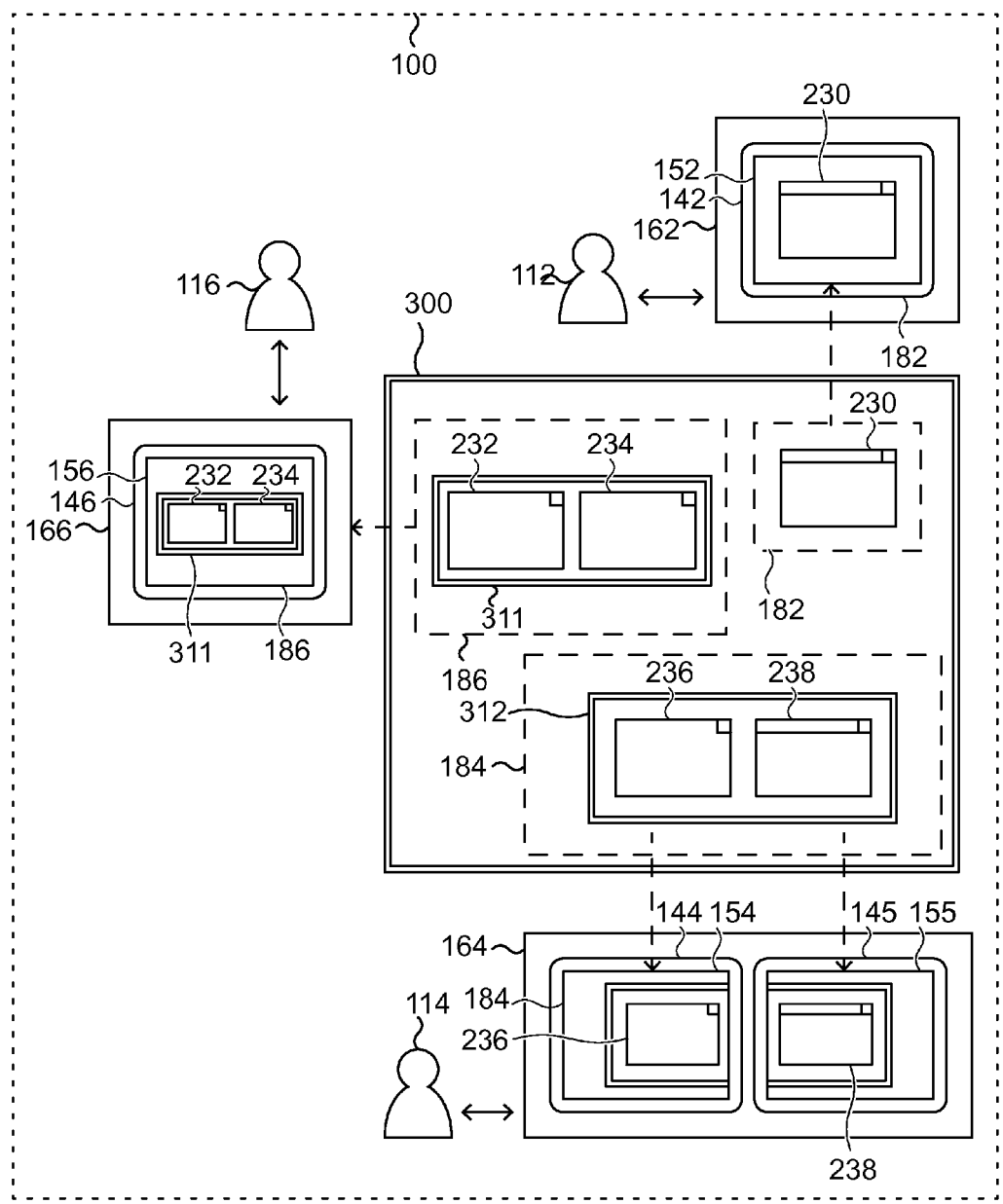
FIG. 5 illustrates a schematic block diagram of one embodiment of the present disclosure where different users with individual viewports focus on a portion of a desktop environment presented on another device.

FIG. 5 illustrates one embodiment where different users 112, 114, with different computing devices 162, 164 have individual viewports 182, 183, that can be used to focus on or obtain a view into the desktop environment 300 shown on the display device 141 of another computing device 161. As shown in this example, desktop environment 300 includes sub-environments 310, referenced in this example as sub-environments 311 and 312, and a resource 230. The viewport 182 is used to focus on, gain a view of, and interact with, resource 230 within the desktop environment 300, while viewport 183 is used to focus on, gain a view of, and interact with resources 236, 238 within sub-environment 312. A viewport 181 is shown on computing device 161 focusing on resources 232 and 234 of desktop environment 300. The owner or operator of computing device 161 with desktop environment 300 can enable selective sharing of resource 230 and sub-environments 311, 312 within the desktop environment 300 with the other users 112, 114. While only three viewports 181, 182, 183 are shown in this example, in alternate embodiments, more or less than three viewports can be provided focusing on different desktop environments and resources of the desktop environment 300.

In the example of FIG. 5, user 112 is associated with computing device 162, which is coupled to a display device 144 with display area 150. User 114 is associated with computing device 164, which in this example is a single system with two display devices 146, 148, such as a dual monitor display setup, with respective display areas 151, 152. Viewport 182 is provided on display device 144 of computing device 162, while viewport 183 is provided on, or is spread across, one or both of display devices 146, 148 of computing device 164. In alternate embodiments, each of the display devices 146, 148 could be provided with its own viewport 180.

FIGS. 6-10 illustrate examples of configurations of an exemplary viewport 180. In FIG. 6, the viewport 180 is coextensive with, covers or encompasses a substantial entirety of the screen or display area 150 of the display device 140. In FIG. 7, only a portion of the display area 150 of display device 140 is encompassed by the viewport 180. In the example illustrated in FIG. 8, the display device 140 has multiple, but separate, viewports 185, 186 across the display area 150. In FIG. 9, where the display device 140 is a dual monitor, the viewport 180 spans across at least a portion of both monitors or display areas 150, 151 of the display device 140.

Figure 10:
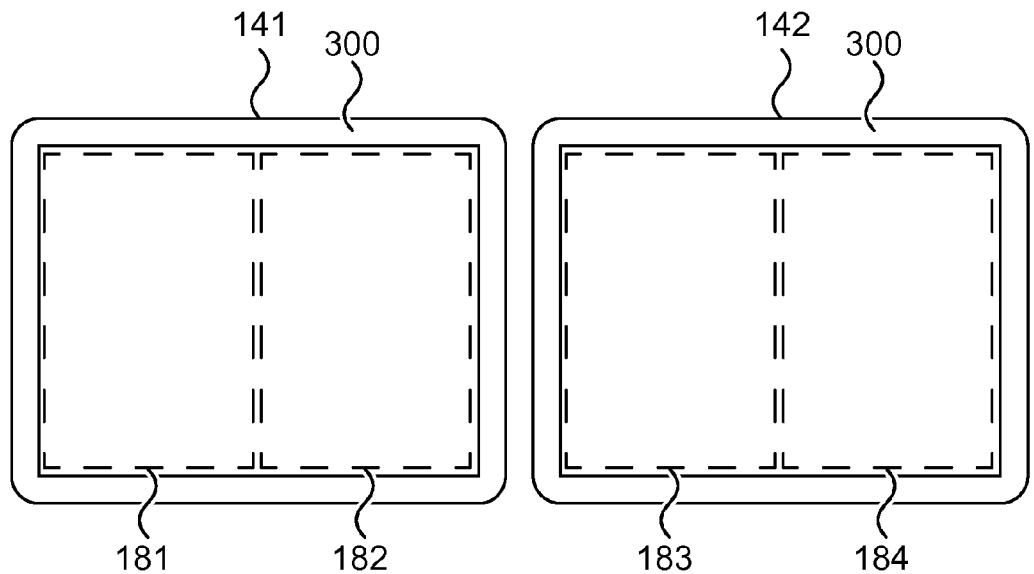

FIG. 10 illustrates an exemplary configuration of multiple viewports 180, shown in this example as viewports 181-184 across multiple display devices 140, shown in this example as display devices 141, 142. Although four different viewports are shown in this example, more or less than four can be provided. The display devices 142, 144 could be coupled to a single computing device 160, or multiple computing devices 160. Also, although each display device 141, 142 is illustrated in FIG. 10 as having two viewports 180, in alternate embodiments, each display device 141, 142 could include any suitable number of viewports 180, including more or less than two, encompassing any suitable portion of a display device 140.

In the example of FIG. 10, the viewports 181-184 are shown in a substantially side-by-side arrangement, each encompassing approximately the same amount of area on the respective display device 141, 142. In alternate embodiments, the viewports 181-184 can be arranged in any suitable manner including partially or completely overlapping on the respective display device 141, 142, or encompassing a different area.

Figure 11:
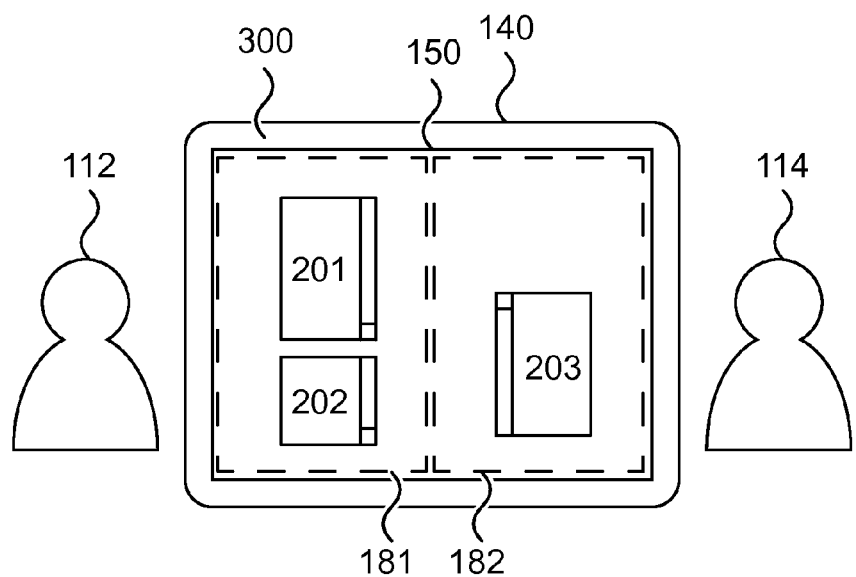

As shown in the embodiments illustrated in FIGS. 6-7, a single viewport 180 may be used to focus on a part of, or the entirety of the display area 150 of the display device 140. The orientation of the viewport 180 may also be freely transformed in the display area 143 of the display device 140. Referring to FIG. 11, in one embodiment, a display device 140 has viewports 180, referenced as viewports 181, 182 within the display area 150. Viewport 181 provides a view or focus to resources 200, referenced as resources 201, 202, while viewport 182 provides a view or focus to another resource 200, referenced as resource 203. In this example, user 112 controls viewport 181, while user 114 controls viewport 181. In one embodiment, the viewports 181, 182 can be transformed or positioned in the display area 150 so that they are visually oriented towards the respective user 112, 114

In the embodiment illustrated in FIG. 11, the single display device 140 is being shared by multiple users 112, 114, each having their own viewport 280, 281 to the shared desktop environment 330. For example, this embodiment would allow co-located users 112, 114 to work together on an interactive table or whiteboard, while the users 112, 114 have their own viewport to the content or resources. This can allow them to work on their own or shared resources and maintain their own workflow.

Figure 12:
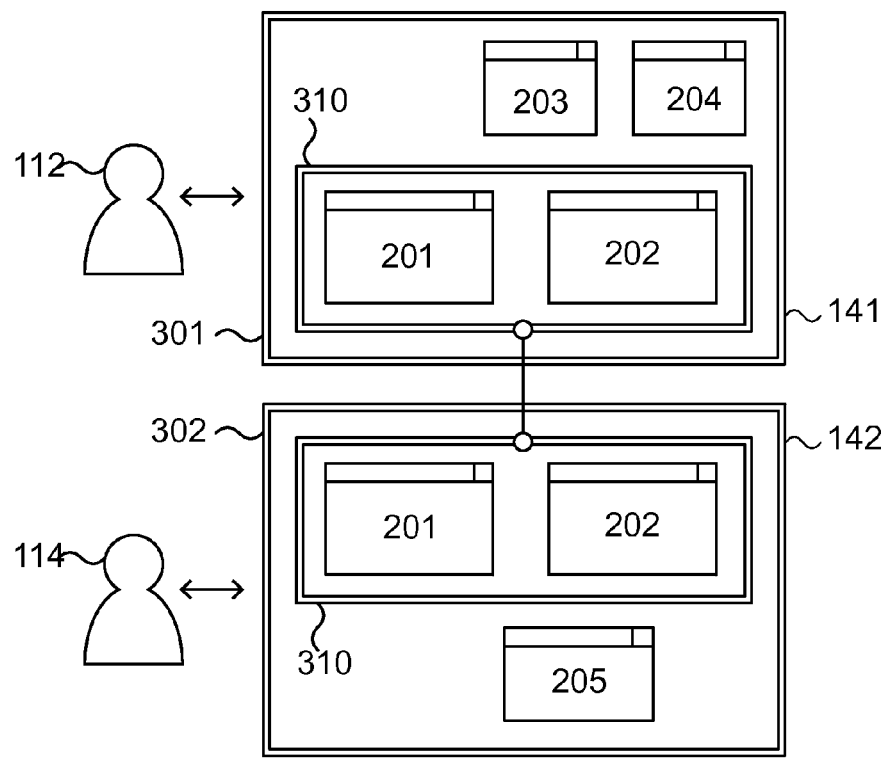
FIG. 12 illustrates a network of nested desktop environments in a system incorporating aspects of the present disclosure.

FIG. 12 illustrates an embodiment where a network of sub or nested environments 310 can be formed. As shown in FIG. 12, user 112 has a desktop environment 310 nested within desktop environment 301, while user 114 may have the same desktop environment 310 nested in their own desktop environment 302. In this example, desktop environment 310 is the shared desktop environment. Users 112 and 114 can access their respective desktop environments 301, 302 but do not have access to other desktop environments beside the shared desktop environment 310. Resources 201 and 202 are the shared resources 200. Resources 203, 204 and 205 are not shared. In this example, the nested desktop environment is the shared desktop environment 310 that is accessed by different users 112, 114 from different desktop environments 301, 302.

In one embodiment, a resource 200 can include a hidden resource, or one that is not intended to be shared with other parties, even though the underlying application is being shared. For example, some electronic mail or messaging applications will include pop-up notifications of an incoming email or message. In some circumstances, it may not be desirable to share such notification with other users, even though the underlying messaging application is the subject of the shared desktop environment 300. The aspects of the disclosed embodiments can characterize such notifications as hidden resources, which are then not shared with other users without explicit permissions. For example, in one embodiment, a hidden resource such as a notification will first appear in a non-shared portion of the user's desktop environment 300. The user can then determine whether to share the hidden resource, such as by clicking on or moving the hidden resource to the shared portion of the desktop environment 300.

Figure 13:
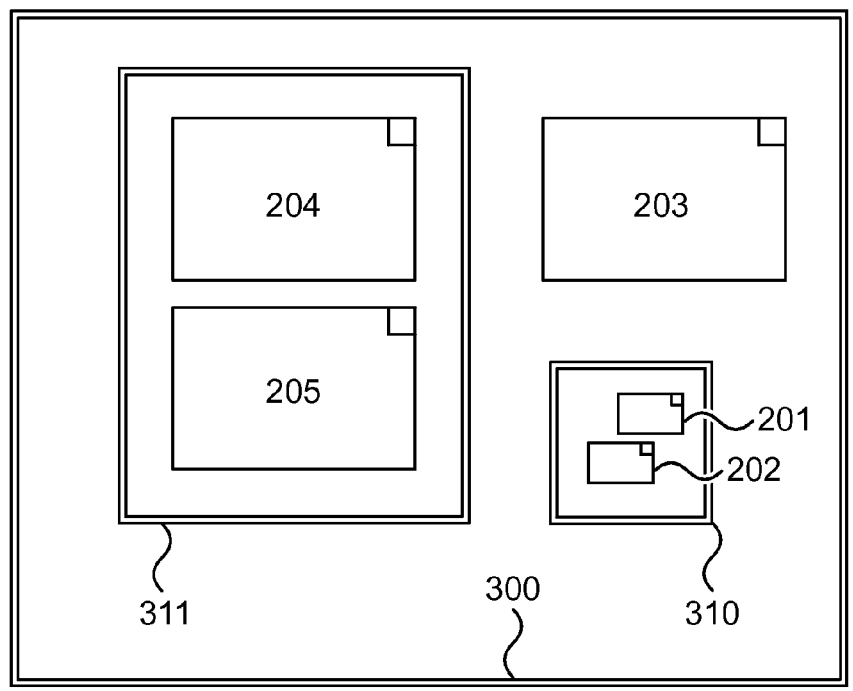
FIG. 13 illustrates another example of a nested desktop environment in a system incorporating aspects of the present disclosure.

FIG. 13 illustrates another embodiment of a nested desktop environment 310. As is shown in FIG. 13, in one embodiment, a nested environment 310 may appear pushed down in desktop environment 300 so that the resources 201, 202 of the nested environment 310 appear smaller in scale when compared to the resource 203 in the desktop environment 300, which for purposes of this example can be considered the parent desktop environment. In one embodiment, another nested environment 311 may also appear to be popped up so that resources 204, 205 of the nested environment 311 appear to be on the same scale as the resource 203 in the desktop environment 300 of this example. If the nested environment 310 is pushed down, a user 110 can zoom in on that nested environment 310 to see the resources 201, 202 in larger scale, leaving behind the desktop environment 300. In this manner, the aspects of the disclosed embodiments can provide an impression of a pushed down desktop environment and zooming in on the pushed down desktop environment 310 in this example acts as a pathway to that desktop environment 310.

Figure 14:
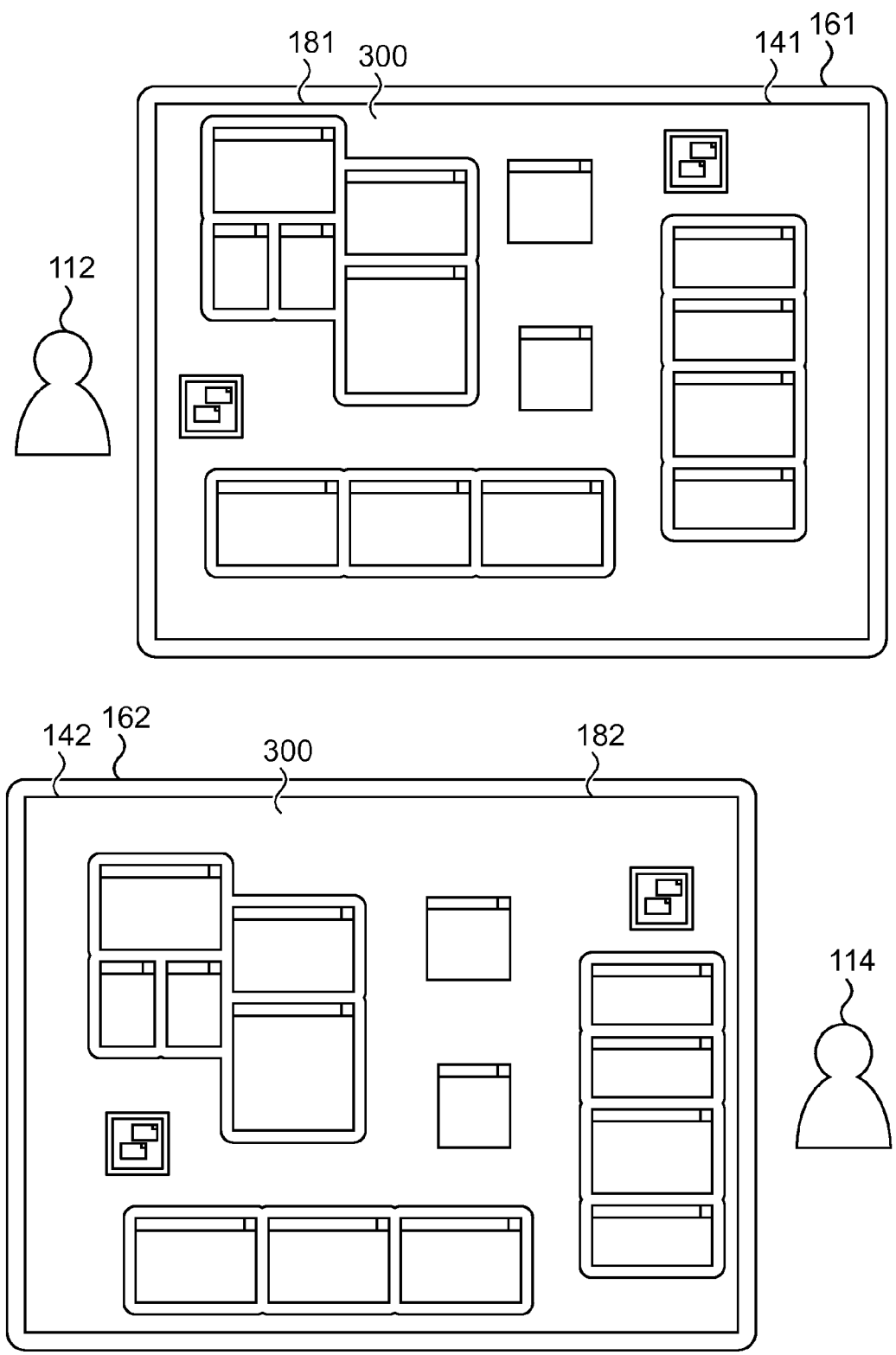
FIG. 14 illustrates one embodiment of sharing a desktop environment in accordance with the aspects of the present disclosure.

FIG. 14 illustrates an example where users 112, 114 are sharing a desktop environment 300, but through separate computing devices 160. In this example, both users 112, 114 have access to the same desktop environment 300. User 112 has a view of desktop environment 300 through viewport 181 on display device 141 of computing device 161 and user 114 has a view of desktop environment 300 through viewport 182 on display device 142 of computing device 162. Both users 112, 114 maintain their own viewport 180, referenced in this example as viewports 181, 182. In this way, each user 112, 114 can navigate between different parts of the same desktop environment 300, including other resources 200 and desktop environments 300, at the same time, but using different computing devices 160.

FIG. 15 illustrates an example of sharing a desktop environment 310 from within different desktop environments 300. In this example, user 112 is associated with environment 301, while user 114 is associated with desktop environment 302. User 112 views at least a portion of desktop environment 301 through viewport 181 on display device 141 of computing device 161, while user 114 views at least a portion of desktop environment 302 on display device 142 of computing device 162 through viewport 182. In this example, users 112 and 114 share access to the shared desktop environment 310 from their respective desktop environments 301, 302. Both users 112, 114 can freely position the shared desktop environment 310, also referred to as a sub-environment, within their own desktop environment 301, 302, the desktop environments 301 and 302 also being referred to herein as parent desktop environments. Only the desktop environment 310 is shared. The desktop environments 311, 312, 313, 314, 315 and resource 201 are not shared.

FIG. 16 illustrates one example of sharing resources 200. In this example user 112 shares a resource 200, such as resource 201 or a group 210 of resources, referred to herein as the shared resources, with user 114. Both users 112, 114 can freely position the shared resources 201, 210 within their own respective desktop environment 301, 302.

Figure 17:
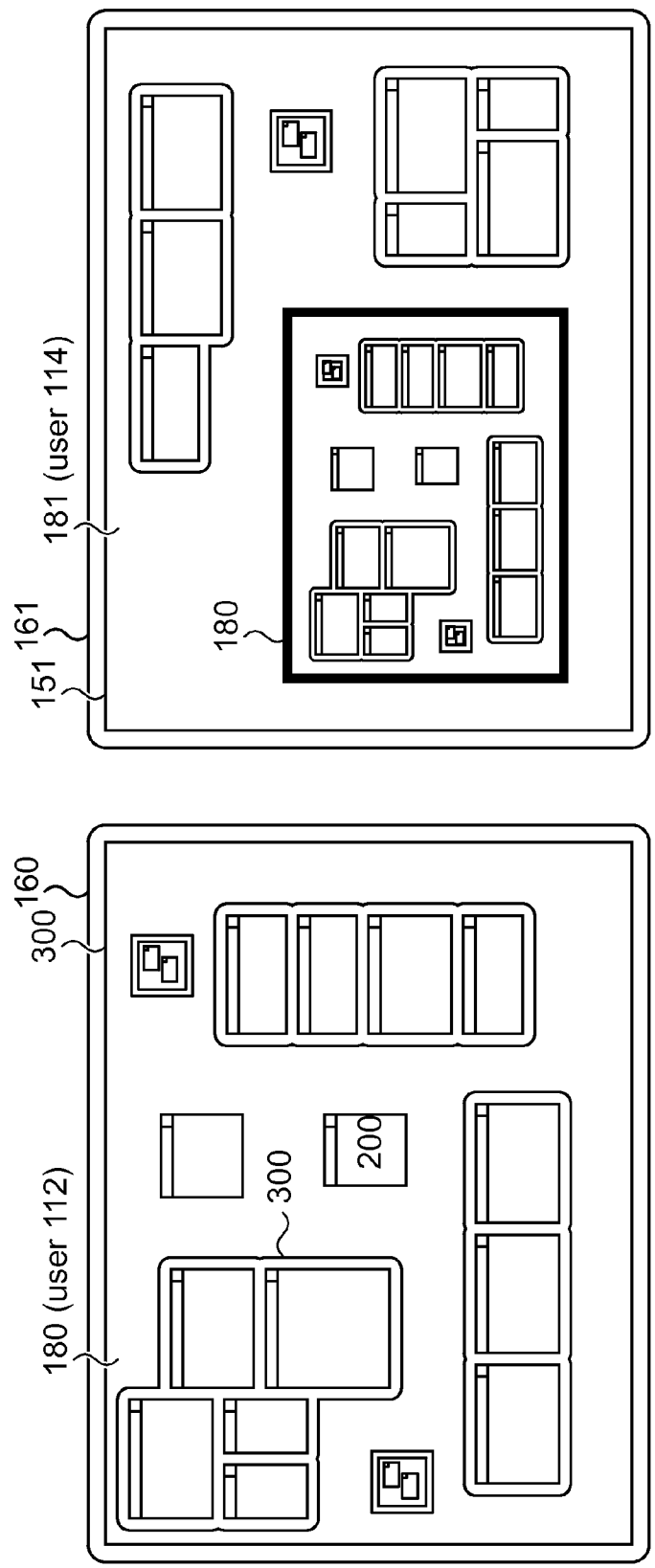
FIG. 17 illustrates one embodiment of sharing a viewport in a system incorporating aspects of the present disclosure.

FIG. 17 illustrates one example of sharing a viewport 180. In this example, user 112, on computing device 160, shares his viewport 180 with user 114 on computing device 161. User 114 can position the viewport 180, including the desktop environments 300 and resources 200 in view therein of user 112, anywhere within their viewport 181, as well as with the desktop environments 300 and resources 200.

FIGS. 18A-18F illustrate one embodiment of how two users 112, 114 may cooperate or establish a cooperative environment for sharing of a resource 202 in a shared desktop environment 301. In one embodiment, one of the users 112, 114, referred to in this example as a host, can invite the other user 114, 112, referred to in this example as a guest, to collaborate. Alternatively, the guest 114, 112 can request access to a resource 200, which the host 112, 114 can accept.

Figure 18:
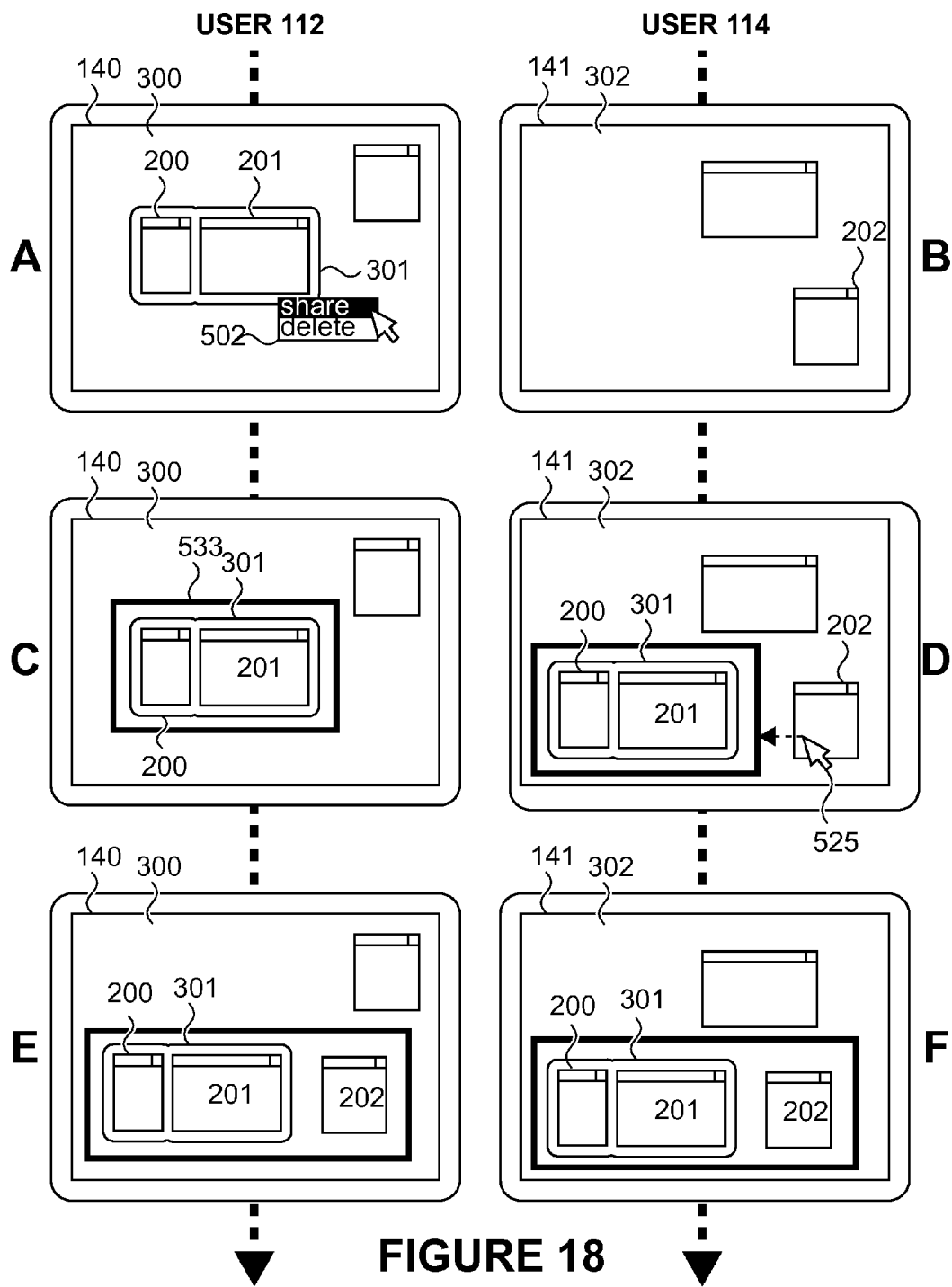
FIGS. 18A-18F illustrate one embodiment of how two users may cooperate or establish a cooperative desktop environment for sharing resources in a shared desktop environment in a system incorporating aspects of the present disclosure.

Referring to FIG. 18A, user 112 selects resources 200, 201 in desktop environment 301 to share with user 114. As is shown in FIG. 18A, context menu 502 is used to designate the selected resources 200, 201 for sharing. Once selected and designated, as illustrated by the bold box 533 around the shared desktop environment 301 in FIG. 18C, the box 533 and desktop environment 301 appears or pops up in the desktop environment 300 of user 114 as shown in FIG. 18D. In one embodiment, the box 533 illustrates a viewport 180 providing a view to the shared desktop environment 301. In FIG. 18D, the user 114 selects a resource 202 from the desktop environment 302 to add to the shared desktop environment 301, using the selection indicator 525. When the user 114 adds the resource 202 to the shared desktop environment 301, the window 202 appears in the shared desktop environment 301 as shown in FIG. 18E. Both users 112, 114 can view, focus on and interact with the resources 200, 201, 202 they have in the shared environment 301, while maintaining autonomy over the non-shared resources and desktop environments in their own desktop environments 300, 302.

While the aspects of the disclosed embodiments are generally described herein with reference to multiple users, the aspects of the disclosed embodiments can also be beneficial for individual users. For example, a single or individual user could use a system according to the present disclosure to share a single desktop environment 300 between a number of computing devices 160 without affecting the layout of the resources 200 on the shared desktop environment 300. For instance, a user could organize resources 201 used at work and resources 202 used at home in a shared desktop environment 300 so that the resources 201, 202 occupy different regions of the shared desktop environment 300. This would enable the user to access both groups of resources 201, 202 using different devices 160 in different contexts (for example, using a computing device at the workplace or a computing device at home) without altering the layout of resources 201, 202 thus avoiding the common problem associated with context switching where one or more resources may have to be activated and brought to the top or towards the top of the stack of resources in order to make switching between those resources more efficient, whilst reducing visibility and accessibility of resources used in other contexts in the process.

Figure 19:
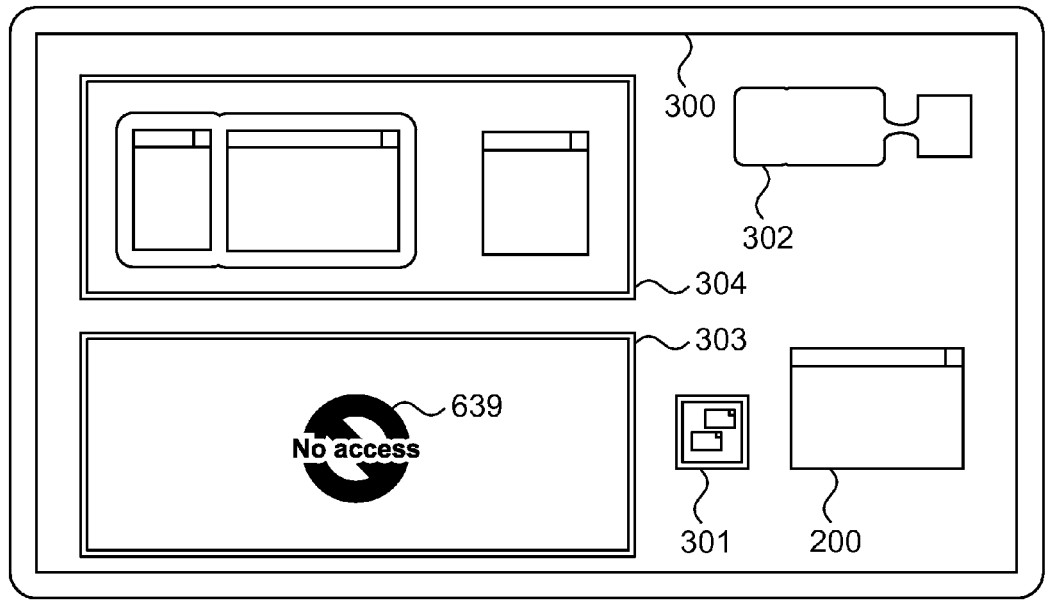
FIG. 19 illustrates one embodiment of an exemplary visual appearance of sub-desktop environments in a system incorporating aspects of the present disclosure.

FIG. 19 illustrates one embodiment of an exemplary visual appearance of a sub-environment 301 and sub-environment 302 within an environment 300. Sub-environments 301, 302 can be shown in the same scale as the parent environment 300, or scaled down. In one embodiment, the sub-environments 301, 302 can generally follow the shape of the content, for example, or be in the form of a tile, or any other such suitable shape. Environments may also be indicated by visual indicators, such as color or icons and such. In the example of FIG. 19, the sub-environment 301 is in the same scale as the parent environment 300, and is in a tile shape, while sub-environment 302 is in the form of a silhouette of the content.

Figure 20:
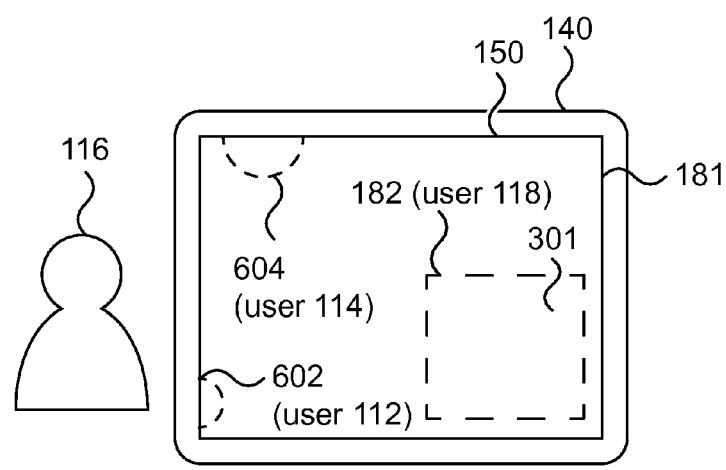
FIG. 20 illustrates one embodiment of position indication in a desktop environment in accordance with the aspects of the present disclosure.

In one embodiment, referring to FIG. 20, the presence or position of viewports 180 relative to the respective desktop environment 300 and resources 200 can be visualized or indicated on the display device 140, so that the user of the particular display device 140, in this example user 116, can see where in or relative to the desktop environment 300 the viewports of the other users, such as users 112, 114, 118, for example, are relatively positioned. In this example, the area of the desktop environment 301 visible through the viewport 182 of user 118 is visualized or displayed within the display area 150 of display device 140, providing user 116 with a sense or indication of what resources user 118 is working on. The viewport 181 of user 116 in this example encompasses substantially all of the display area 150. The viewports of users 112 and 114 are outside the viewport 182 of user 118. Position indicators 602, 604 are used to indicate the relative position of the viewport of the users 112, 114, with respect to a current position of the viewport 181 of user 116. In this example, the position indicators 602, 604 are in the form of a half circle. In alternate embodiments, any suitable shape, figure, icon or image can be used as a position indicator.

In one embodiment, a relative proximity or distance of the user 116 to each of the users 112, 114 can be indicated. For example, in one embodiment, the size of the half-circle 604, referring to the visible portion, could indicate a distance from the viewport 181 in which it appears to the user 112. The smaller the half-circle, the further away the viewport of the user 112, 114 is from the viewport 181 of user 116. In this example, the larger size of indicator 604 relative to indicator 602 indicates that the viewport of user 114 is closer to the viewport 181 of user 116 than the viewport of user 112 is to the viewport 181 of user 116. In alternate embodiments, a smaller indicator relative to a larger indicator could be used to indicate closeness (smaller meaning closer).

In one embodiment, the indicators 602, 604 could also be different depending on whether the respective user 112, 114 actually sees part of the display area 150 of user 116. For example, the indicator 602, 604 could change shape to a rectangle when the respective user 112, 114 has the viewport 181 of user 116 covered. The size of the rectangle could also be dependent on how far behind the user is. The rectangle could also be drawn to only partly show which parts of the display area 150 the user 112, 114 sees.

Drag & Drop Between Users

Referring to FIG. 18D, the aspects of the disclosed embodiments enable a user 110, such as user 112, to drag and drop, or copy and paste, a resource 202 from one desktop environment 302 to another desktop environment 301 so that the other user sharing the desktop environment 301 will then be able to access and interact with the resource 202. For example, the user 112 can execute one or more of a copy and paste function, or a drag and drop function, as is generally understood in order to move resource 202 to the shared desktop environment 301. For example, as shown in FIG. 18D, resource 202 to be shared is selected. The selection of the resource 202 can take place in any suitable manner, such as for example by using a context menu 502, dragging and dropping the selected resource 202 using the mouse or other suitable keypad or keyboard function or command, such as ctrl+c/x. To move a resource to another user, referring to FIG. 20, the indicator 604 of the other user 114 is selected or activated as the target destination for the selected resource 202 by for example, clicking on the indicator 604. A paste function could then be activated to complete the copy and paste action, such as for example a ctrl+v. In this way, a user can move or transmit files from one user to one or more other users.

Proxies of Resources

Figure 21:
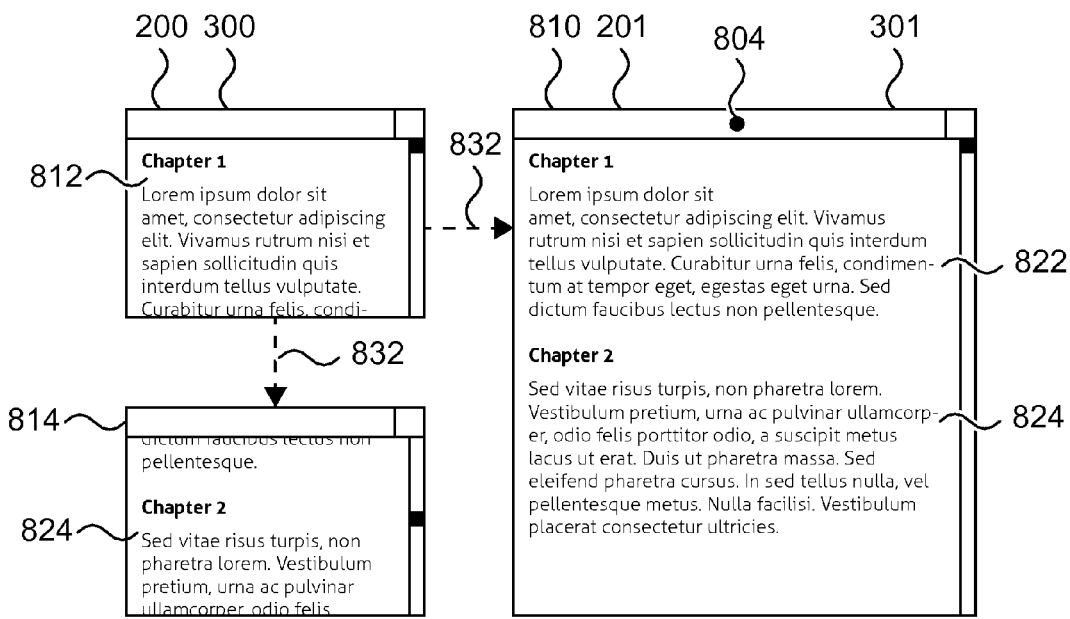
FIG. 21 illustrates one embodiment of proxy creation in a system incorporating aspects of the present disclosure.

Referring to FIG. 21, the aspects of the disclosed embodiments allow for users 110 to create proxies 810 of resources 200. In one embodiment, proxies may also be considered resources. Through proxies, one user 112 can view or work on the resource 200 separately at a different location than user 114. It may also be possible to interact with a proxy 810 and different proxies may illustrate different representations of the original resource 200. This allows the original resource 200 to remain where it is in the environment 300, but the one or more proxies 810 of that resource 200 are also shown on the desktop. For example, in one embodiment, the resource 200 is a window showing a text based document 812 or a text file. The proxies 810 may show different parts 822, 824 of the text file 812 so that different users can edit different paragraphs not visible through the other proxies 814. This allows a user 112 to work with a resource 200 without affecting the working context of other users 110. As another benefit, a window that is customarily in a specific position in an environment 300 can remain in that position. A user 112 can create a proxy 810 of the window to work with, and other users 110 will still find the window where they would expect to find it in the environment 300.

In one embodiment, a proxy 810 may include an indicator 804 to identify that it is a proxy 810 and not the original resource 201. The indicator 804 can comprise any suitable indicator, such as for example a geographical symbol, icon, highlight, image or colored dot. Locating the proxies using the visual indicators 804 will enable one user 112 to determine if another user 114 is working on the proxy 810, and for example, determine if the proxy 810 can or should be disposed of.

As shown in FIG. 21, in one embodiment, a visualization or visual indicator 832 can be provided that provides an indication of the origin of the original resource 200. This visualization can be helpful in locating the original resource 200. For example, looking for relevant information about information in a proxy 810 can involve locating the original resource 200, which may have related resources in its vicinity assuming relevant resources have been arranged close to each other. This is made easier if there is a visual indicator or visualization of where to find that resource 200.

Figure 22:
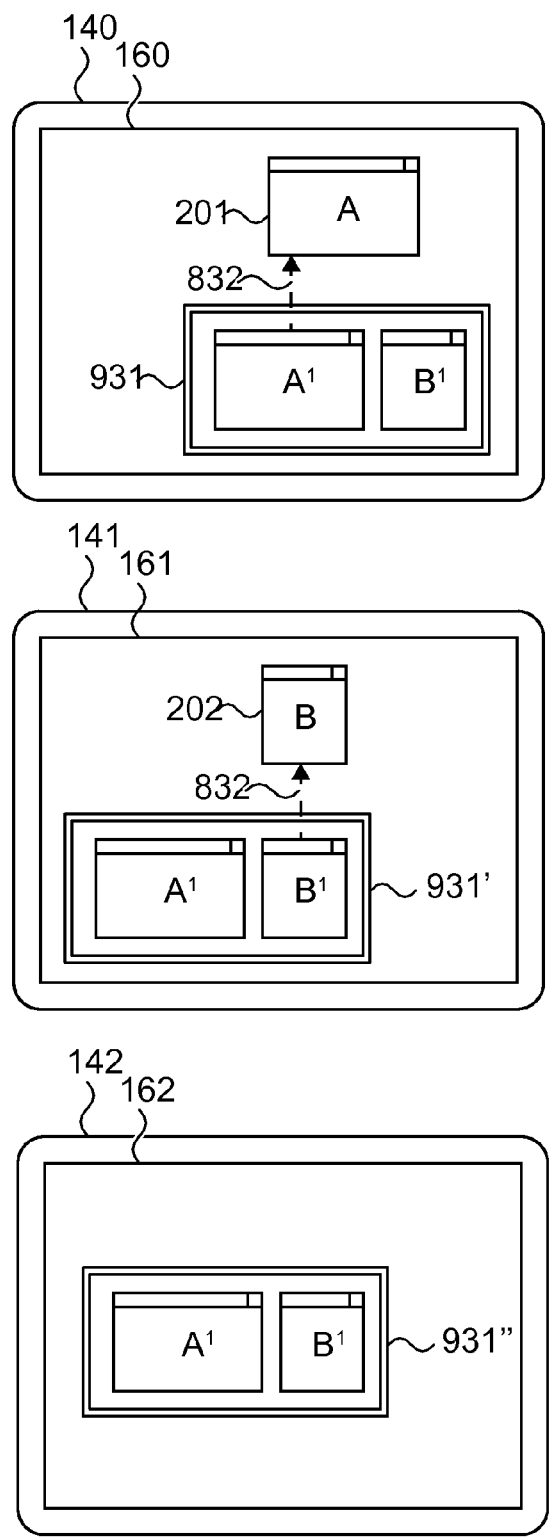
FIG. 22 illustrate an embodiment of resource sharing between users in a system incorporating aspects of the disclosed embodiments.

In the example shown in FIG. 22, the indicator 832 is in the form of an arrow. In one embodiment, the indicator 832 can be provided or made visible in the resource 200, that when clicked-on, will indicate the original resource 200, such as by pointing an arrow to it. Additionally, in one embodiment, the most recently used proxy 810 for each resource 200 can have a different indicator than the other proxies. The proxy indicators 832 can also be configured so that they provide an indication of when the proxy 810 was used, such as a strength indication.

In one embodiment, the original resources 201 may not be removable until all proxies 810 have been removed from the desktop environment 300.

In one embodiment, a proxy 810 enables a user 110 to provide others with access to a resource 200, even in another desktop environment 301, and keep track of where the resource 200 is seen and used. The user 110 does not have to move the original resource 200 and the indicator 804 of a proxy can help the user 110 keep track of their own resources 200.

FIG. 22 illustrates one embodiment of the present disclosure where a first user device 160 and a second user device 161 are configured to share content or resources to and between each other, as well as with a third user device 162. In this example, the first user wants to only share content A from the resource 201 and the second user wants to only share content B from the resources 202. A proxy group 931 is formed and presented on the display device 140 of the first user device 160. In one embodiment, the first user creates the proxy group 931 (for example by accessing a context menu of an existing environment and selecting a menu option corresponding to the creation of a new environment) and adds a copy of the content A (e.g. a proxy showing only the content part of the resource 201) referred to here as $A^1$ into the proxy group 931. The proxy group 931, including the copy of content A, is shared with the second user device 161. A version of the proxy group 931 is presented on the display device 141 of the second user device 161 as proxy group 931'. In one embodiment, the first user can also share the proxy group 931 with the third user device 162, shown in FIG. 25 as proxy group 931". As shown in FIG. 22, the second user adds a copy of content B to the proxy group 931', and the content B is now visible in the proxy groups 931 and 931".

In one embodiment, the proxy group 931 can be passive or be configured to be edited by designated users. For example, in one embodiment, the content $A^1$ can be edited by the user of the first device 160, the content $B^1$ by the user of the second device 161, while the user of the device 162 is not enabled to edit either content $A^1$ or content $B^1$. Generally, any of the user devices 160, 161 and 162 that are configured with Read/Write privileges, as those are generally understood to be known, can edit any content within the proxy groups 931, 931' and 931".

Abstract Resource Layouts

The layout of resources 200 in a desktop environment 300 can be specified in an abstract fashion. This can be done by specifying their relations towards each other, such as for example "resource a left of b" or "resources g, h, i, j, k, l, m belonging to the same group where central resource "g" is surrounded by resources "h-l" or resources n, o, p, q, r, s, l with parent-child relationships, parent(n, o), parent(n, p), parent(o, q), parent(o, r), parent(r, a), parent(r, l).) This advantageously allows the resources 200 to be shown to different users in different dimensions. For example, users with computing devices 160 that have different characteristics, such as resolution, can share the same resources 200 and the layout of resources 200, even though they may see the resources 200 differently on their respective display devices 140. For example, the same resources 200 could be presented with different dimensions and arranged differently to different users in absolute coordinates depending upon the resolution of the display device 140 used. Nested environments might be shown minimized on display devices 140 with a small display resolution.

Window Minimization to Taskbar

The aspects of the disclosed embodiments generally enable that the windows or resources on the desktop that the user wants to see or work with are not minimized to the taskbar, while alerts and other windows can be minimized. A taskbar is generally understood as a temporary storage facility for windows that are not currently used. However, this feature does not work well in a desktop that is shared by multiple users because another user might need a window even if one user currently does not. Resources 200 that the user is working with or wants to see are generally not allowed to overlap or be minimized. Thus, users working on resources 200 in the same desktop environment 300 will typically be easy to locate, since one resource 200 cannot be in the taskbar or be positioned behind another resource 200, out of view another user looking at resource 200 will able to be found.

Operating in the Same Environment with Other Users

The aspects of the disclosed embodiments allow different users to share a space for a meeting, with all parties to the meeting being able to have the meeting within the context of their own resources. For example, referring to FIG. 12, in a meeting between two users, or groups of users, one of the users shares a sub-environment 310 with the other user. The other user opens the shared desktop environment 310 in their desktop environment, such as user 114 in desktop environment 301. In one embodiment, one user can have the sub-environment 310 minimized or pushed down while the other user has it maximized. Both users now have the sub-environment 310 merged into their own respective desktop environments 300, 301 with their own resources 200, such as 204, 204 and 205, nearby. Another user or group of users taking part in the meeting could access the shared sub-environment 310 from the context of their own resources 200. For example, a user 116, not shown in this example, could open a web browser and locate a certain resource 205 in the context of their own resources before sharing it with others in the sub-environment 310 where the meeting is taking place.

In one embodiment, users can have multiple nested meetings at the same time in the same environment. For example, a user could start two or more meetings at the same time. Each meeting could have one or more additional nested meetings with other users. A user could have separate meetings going on with different users. The user can move between the two or more meetings.

In one embodiment, if the amount of activity detected in a sub-environment 310 is at or below a pre-determined threshold level, meaning little or no activity is taking place within the sub-environment 310, the sub-environment 310 can be minimized automatically to save display space e.g. when the user zooms out. In one embodiment, minimization of desktop environments 310 could be used to provide a confined work area for a group of users. Navigation, for example, could be confined into a sub-environment 310 as long as the user does not zoom out of the sub-environment 310. In one embodiment, a nested environment 301 is not intended to be used directly from the parent desktop environment 300, meaning that for instance clicking within the region of a nested environment 301 will not have an effects in that environment but may instead be interpreted as a command to zoom into that environment 301. The nesting of environments may also support optimization of network bandwidth use and uses of other resources, e.g. because less image data needs to be transmitted over the network when some windows will appear in smaller scale and can be represented using smaller resolution images. The small visual representation of resources 200 may not need to be updated frequently, even if visible to the user, assuming that the user is not actively following desktop environment 300 that shows in small scale on the display.

In one embodiment, an indication is provided that informs the user whether a desktop environment 300 is a remote or distributed environment. This will make users aware of whether they are operating in a volatile setting, generally meaning that the user can be aware if a change they are planning to make to a resource 200, such as a file, can be undone, damaged or lost if the network connection to the remote environment is interrupted. The indication will also allow the user to determine if their actions in the remote or distributed environment may be perceived by others.

The aspects of the disclosed embodiments can also be used to provide support to different computing devices 160. For example, in the example of FIG. 5, the different users 112, 114 are using different computing devices 162, 164, where different computing devices 162, 164 can have a different display resolution or configuration. In one embodiment, a determination can be made whether to present sub-environments 311 to the environment 300 in either a minimized or maximized view, to match the specific user needs and resources. The determination can be made by the user 114 in this example, or automatically based on characteristics of the computing device 164, such as for example, display resolution and configuration. In the example of FIG. 5, the computing device 164 comprises a dual-screen or monitor display device, where the shared environment 312 can be presented on or across one or both of the display devices 144, 145.

In one embodiment, referring to FIG. 19, a sub-environment 303 and its resources 200 can have a different representation that prevents non-public details of the desktop environment 303 from being viewed from outside of the environment or before having granted access. As shown in FIG. 19, desktop environment 303 has a different representation of an icon or image, for example 639, viewed from the parent desktop environment 300, indicating that the sub-environment 303 cannot be viewed before having granted access. This can be advantageous in a situation, for example, where a meeting is to be held in a private desktop environment 300.

Access Rights

Referring to FIG. 1, environment 300 and resources 200 can have access rights so that they are not freely accessible to all users 110-110n. In one embodiment, referring to FIG. 19, an indication 639 can be provided that represents to a user, the level of rights and/or privileges that are required to access the specific environment 303. Certain credentials may need to be provided, such as a user name and password, for example. Rights and privileges can include for example, but are not limited to, read, write, execute, copy, cut, move, delete, and resize. In alternate embodiments, suitable rights and privileges can be encompassed.

Providing access rights, and different levels of rights and privileges, can be beneficial in the multi-user desktop environment 300 in order to control what users 110 can do. It may be desirable to ensure that certain users 110, or user groups, do not view, move or edit resources 200 that should only be seen, managed or edited by some users. It may also be desirable in some cases to specify, for example, that certain resources 200 cannot be moved to another desktop environment 300 that requires different access credentials to avoid accidental disclosures to parties that should not have access to a particular resource or resources 200.

In one embodiment, referring to FIG. 12 for example, a user 112 can dedicate an environment 310 to those resources 201, 202 that the user 112 is willing to share to another user 114. This can be advantageous, for example, in remote support situations where the user 112 needs to allow a user 114, such as for example a technician, to assist them with specific resources 201, 202, such as application windows.

Layouting

Referring to FIGS. 18A-F for example, in one embodiment, the resources 200 within the desktop environments 300 of the disclosed embodiments generally do not overlap, or substantially obstruct the content of one another. For example, when a resource 202 is added to environment 301, the resources 200, 201, as well as resource 202, will be arranged so that there is no overlap or substantial obstruction of content. In one embodiment, a size and position of the viewport 180 can also be rearranged to minimize distraction from the layout change.

In one embodiment, when a resource, such as resource 201 that is currently being viewed by the user 112 moves on the desktop environment independently of the actions of user 112, the viewport 180 of user 112 may also move. This will be beneficial to avoid the user 112 being distracted by changes in the position of the resource 201, or even lose resource 201 entirely out of his/her sight. In one embodiment, the layout changes can be recorded and saved in memory for future use, such as for example, playback.

In one embodiment, when a resource 202 is moved, such as by dragging, so that it occupies the same area of the environment 301 as another resource 200, the resource 202 may show primarily on top of any other resources 200, 201 in the environment 301. If multiple resources 202 are being moved at the same time, the moved resources 200, 201 may appear to overlap.

In one embodiment, a desktop environment 300 that is designated to be shared may also be temporarily shown to the user prior to sharing.

For example, referring to FIG. 17, in this example, the portion of the environment 300 focused on in the viewport 180 of user 112 is designated to be shared with computing device 161 of user 114. In one embodiment, it is possible to move the viewport 180 and show it to the user 114 by moving the viewport 180, including the environments 300 and resources 200 contained therein. The viewport 180 is moved into the viewport 181 of the other user 114, in which case the user 114 will automatically receive a question from the system 100 asking whether the user 114 wishes to see the contents of the viewport 180. The question can be presented in the display area 151 of the display device 161. In one embodiment, the target user 114 has to accept the resource to be placed in his viewport prior to the resource being placed in his viewport 181. In this example, the resource comprises the viewport 180. In an alternate embodiment, a resource such as resource 200 shown in FIG. 17 could be selected to be shared. This could be facilitated for example, by the user 114 accepting the invitation.

User Grouping

Referring to FIG. 20, users 112, 114 and 118 on the desktop and the position indicators 602, which in one embodiment are live video images, may be grouped based on the position of the users. For example, users close enough to each other can belong to a group of users. Users working on a specific group of resources in a specific area of an environment 300, or in a specific environment, could be determined to belong to the same group.

Grouping may also be used to enable messaging, generally meant to encompass the transmission of text, voice and video of the user, between certain users. In one embodiment, there is a custom shape aura with a specific extent to each direction, which may be indicated visually, around a user 110 or group that can be used to determine if two given users or groups belong to the same group. Users may also be able to form groups explicitly or define explicitly that they do not belong to one or more groups. Groups may also have access policies such that a user 110 has to be accepted to a group, and may be required to provide log-in credentials. Groups can also have time-dependent membership policies such that group membership may persist for a certain time period even if a group member is not within the group reach, meaning the aura of the group could also be determined by distance, whether indicated visually or not.

In one embodiment, group of users may be indicated to each other so that users can identify who belongs to which group, both in a zoomed in and zoomed out view. In one embodiment, a group member's indicator may be connected with visual connectors, such as lines of a specific type, weight or color, in zoomed out or zoomed in views. By visualizing the aura of users and groups when zoomed out, connected auras may indicate belonging to the same group or may have auras of the same color. A common indicator, such as a circle, triangle or other suitable shape, can be used for users in the same group, to indicate group membership, such as for example in a zoomed-in view, where aura may not be displayed in order to avoid visual clutter. Groups may also be indicated differently depending upon whether a user belongs to a group. For example, in those groups where a user belongs, the user indicator can be a live video image, while indicators of users who belong to other groups may be icons. If a user belongs to multiple groups, the indicators of members in different groups, such as the live images, may be grouped spatially or by being connected visually, using for example, lines or appearing inside the same shape visualization.

In the example of FIG. 2, the desktop environment 300 includes resources 200. In this example, resources 200 can be a movie, a news or sports web page, a video or movie and a television news feed. Resources 205 and 206 in desktop environment 311 can comprise user indicators, which in this example are video feeds or live images of different users.

Figure 23:
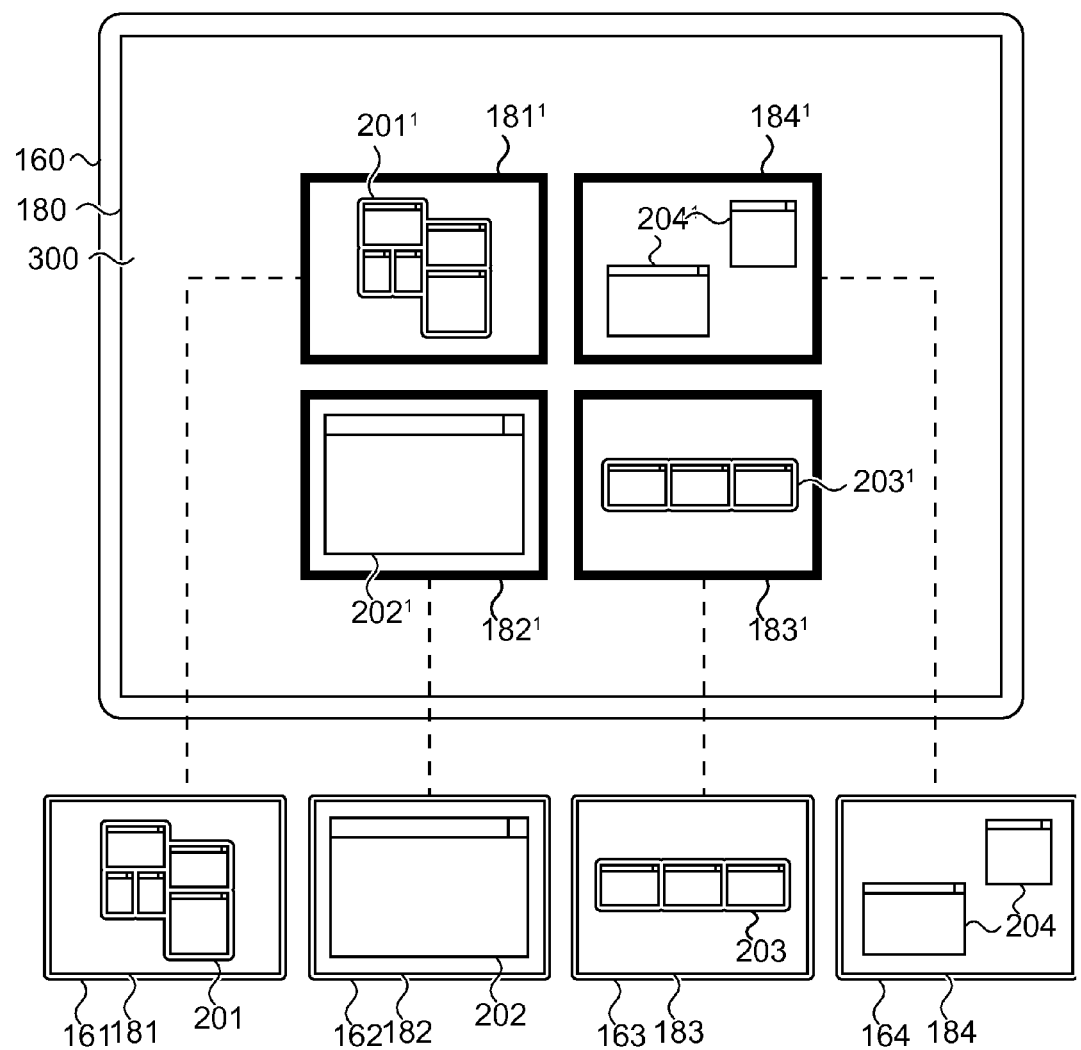
FIG. 23 illustrates an exemplary application of the aspects of the present disclosure.

FIG. 23 illustrates an embodiment of the present disclosure where one user, referred to as the manager, can monitor the activity or progress of other users. In this example, the managing computing device 160, also referred to as the managing screen, includes viewport 180, which provides a view to the environment 300. The environment 300 in this example is used to monitor the activities of the user computing devices referenced as 161, 162, 163 and 164, also referred to as the observed devices or screens. In particular, the managing device 160 is configured to access the viewports 181, 182, 183 and 184 of the observed devices 161, 162, 163 and 164. The resources 201, 202, 203 and 204 on the observed computing devices 161, 162, 163 and 164 are proxied or mirrored in the viewport 180 of the managing computing device 160 as proxied viewports 1811', 1822', 183' and 184', with proxied resources 201', 202', 203' and 204'. As changes are made to any of the resources 201, 202, 203 and 204 in their respective viewports, these changes will be automatically reflected in the proxied resources 201', 202', 203' and 204', in their respective viewports presented in the managing viewport 180.

Figure 24:
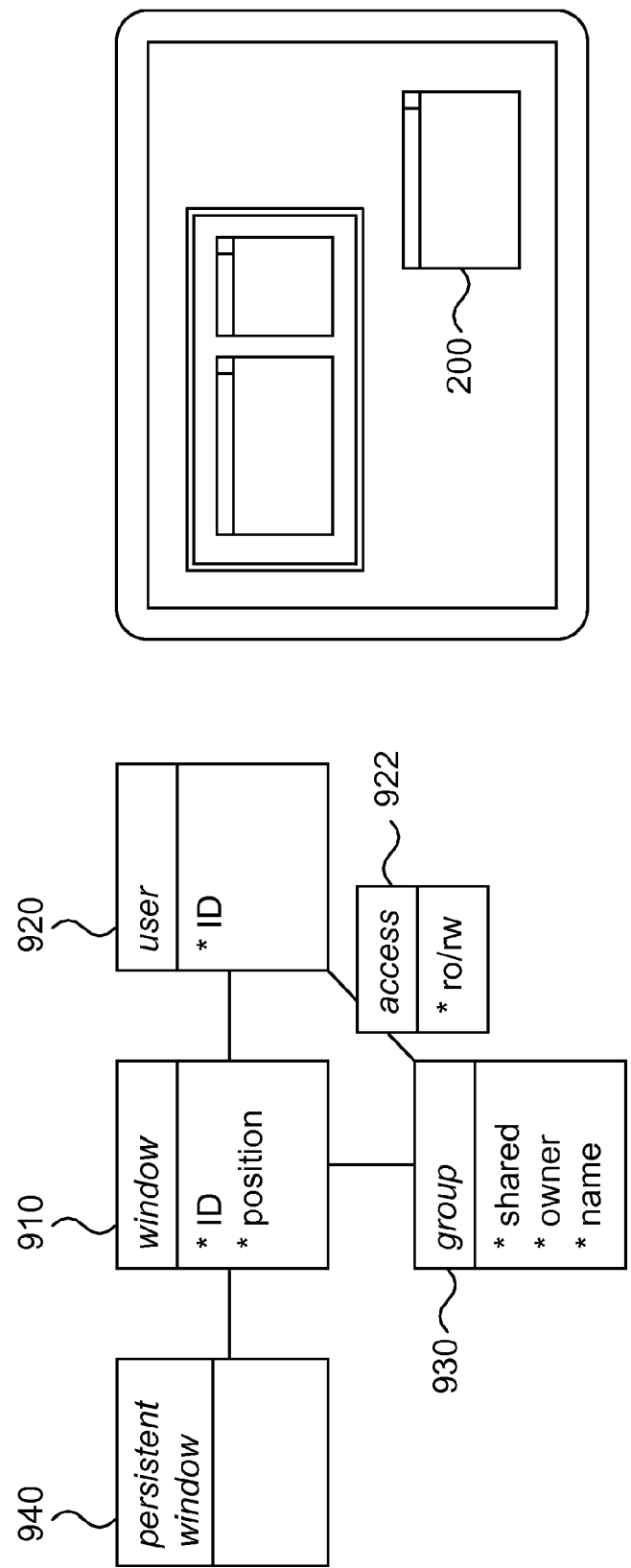
FIG. 24 illustrates a schematic block diagram of one embodiment of a computing architecture for implementing aspects of the present disclosure.

Referring to FIG. 24, one embodiment of a computing architecture incorporating aspects of the disclosed embodiments is illustrated. In one embodiment, in a Windows™ environment, user management can be tied to domain/user accounts. The information and data pertaining to each environment (here referred to as a group), resource and user is maintained in respective database tables, shown generally as table 910, 920, 922 and 930. The different database tables will have relationships to at least one other table. For example, a window table 910 will include at least information pertaining to the window identity and on-screen position of the resource 200. The user table 920 will include the user identity information for the user associated with the resource 200. In one embodiment, such as in a Windows™ environment, the table or functionality is tied to domain or user account information. A group table 930 will include information pertaining to a shared status, such as for example, an owner identification, name and color.

In one embodiment, the window table 910 and the user table 920 will be related with respect to the active user who is currently using the resource 200. In this example, an "active user" is the owner of an active window, where a user can only have ownership over one window. Since a given window belongs to a given group, the window table 910 and the group table 930 will be similarly related. The user table 920 and the group table 930 will generally have an access rights relationship. A user will have to be granted privileges 922, such as READ, WRITE access, or a combination thereof, for a given group.

In one embodiment, a persistent windows table 940 is used to store information pertaining to windows that are persistent. Windows that are persistent are generally ones that open in a predetermined place, for example within the desktop environment 300, with predetermined content opened. For example, when a document is opened, the document can be opened in substantially the same position as when it was last open. This can be advantageous when maintaining a group for example, that includes all office application windows.

Figure 25:
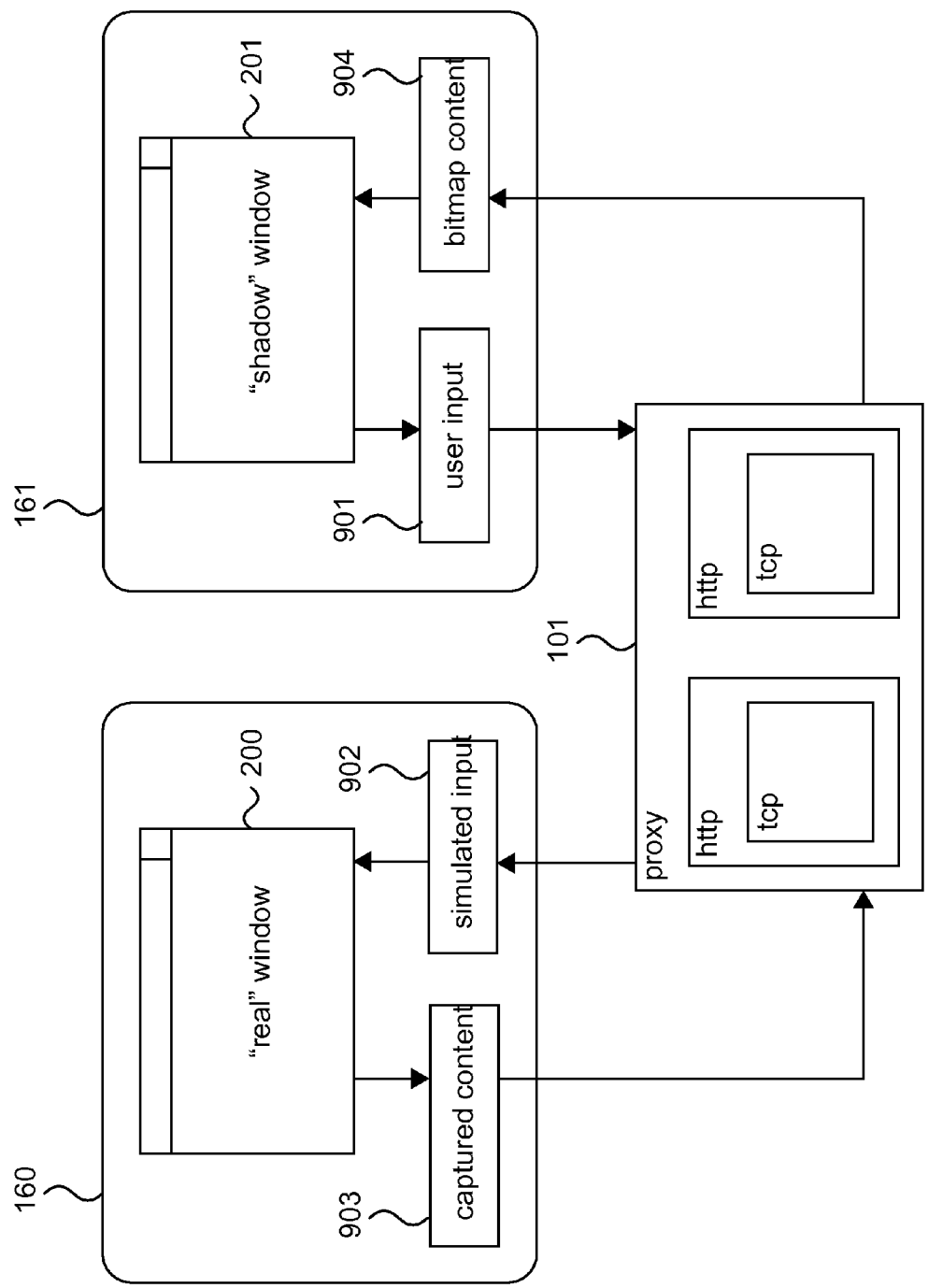
FIG. 25 illustrates another exemplary computing architecture for implementing aspects of the present disclosure.

FIG. 25 illustrates one embodiment of a computing architecture incorporating aspects of the disclosed embodiments. In this example, a computing device 160 and a computing device 161 are coupled together by a network 101, such as the Internet. The Internet 101 is configured to transfer data to and between the computing devices 160, 161 using HTTP (over TCP). Computing device 160 includes a Real Window or resource 200 that contains information presented by an application running on computing device 160. The information or content can be in the form of a bitmap of the window, and needs to be transferred to computing device 161. The information is encoded, such as with a codec, and the compressed data is transferred via the Internet 101 to the computing device 161.

In the embodiment shown in FIG. 25, the computing device 160 includes a shadow window or resource 201 that is a real window to the operating system of the computing device 161, but whose contents are controlled. The content data is received from the Internet, decoded and drawn onto the shadow window or resource 201.

In one embodiment, when the user of the computing device 161 interacts with the content of the shadow window 201, such as for example by clicking with the mouse or touching the touch screen, the input events are transferred to computing device 160 over the Internet 101. The meaning of the input events to the shadow window 201 are interpreted by computing device 160, as it is computing device 160 that is running the actual application comprising the resource of the real window 200. In this example, computing device 161 only has a photo image of the contents of the resource represented by the real window 200.

After passing through the Internet 101 from computing device 161, the input data 901 is received by computing device 160 as is passed to the real application window 200 as a simulated user input. In this embodiment of the present disclosure, the application running on the computing device 160 does not distinguish the simulated user input 902 from one that might be received from a user of computing device 160. Based on the received simulated input 902, computing device 160 updates the contents of the resource represented by the real window 200. The updated information, referred to as captured content 903, is encoded and then sent to computing device 161 as bitmap content 904 to update the contents of the resource represented by the shadow window 201.

One example use of a system incorporating aspects of the present disclosure can involve members of a team of designers (e.g. of a team of designers in charge of designing a car) who invite other members of the team to connect to an environment. In this example, it could be a specific desktop sub-environment of the inviting user that has been created for a joint work session with the other team members. An invitation to share content or the desktop environment may be generated for instance by bringing up a context menu of the sub-environment by right clicking inside the sub-environment and then selecting a menu option corresponding to the action of sharing the desktop sub-environment with other users and then selecting from a list (e.g. in a window that is displayed on the screen as a result of the menu selection) the users that the sub-environment in question should be shared with. (The list from which the users are selected can also be managed by the team member so that it is possible to add and remove people to and from the list by their user names or other contact details, similarly as in other systems that support real time communication or cooperation with other people, such as Skype™ or Windows Live Messenger™.) As a result of sending the invitation to the team members, the invited team members may receive a notification in their environments, such as for example an activatable link, that they have been invited to open a shared environment with the team member that sent the invitation. In one embodiment, the invitation may be presented as a window where a question is presented asking whether the invitation is to be accepted. Upon accepting the invitation, a sub-environment will be created in the environment shared by the inviting team member. With the shared sub-environment appearing within their environment, one way that a user could move their own windows or resources to the shared environment would be simply by dragging the resources to the shared environment. In this way, all of the invited or connected users that share the same environment will see the same windows appearing in the shared environment. For instance, the team members could all move their own Computer-Aided Design (CAD) windows to the shared environment so that whilst different members of the team may work on different parts of the larger design, the team members could zoom out to see how work progresses on the other parts of the larger design in the windows of the other team members. Alternatively, a game development team might use a shared environment so that a graphics designer might work on the graphical design of an item in a game, such as a sword, in a CAD design application window and when ready with the design, move the item directly to an integrated development environment (IDE) window of the programmer in the same team who could then run the game in a new window in the same environment so that both the graphical designer and the programmer could see how the sword looks in game play.

Another example of the use of a system incorporating aspects of the present disclosure, two programmers could use a shared desktop environment 300 to cooperatively implement a new feature in some software so that either of the two programmers could work on one of many related source code documents or programming tools arranged in the shared desktop environment 300. A shared desktop environment 300 according to the aspects of the disclosed embodiments could also be used to support working in various control room or mission control situations or other situations where one or more agents may need to monitor or coordinate actions of others that are working with a number of shared resources 200. For example, a large shared display device 140 could be used to show the shared desktop environment 300 in zoomed out mode so that the manager or anyone else could take a look at the shared display device 140 to monitor or coordinate actions of individual workers or groups of workers that could generally be focused on their own display devices 140 showing smaller regions of the shared desktop environment 300 or perhaps just individual resources 200 therein. In schools or other teaching situations, teachers could benefit from having pupils with laptops be present in a shared desktop environment 300 during class so the teacher can monitor that the pupils are not active on extra-curricular activities when they should be focused on the topic of the class.

Shared environments according to aspects of the disclosed embodiments could also be used for various social purposes. Friends might use a shared environment for collaborative web searching so that different parties are using different web browsers, yet all parties could at any time easily see what the other parties have found or are looking at. Gamers could use a shared environment to hang out with friends playing video games; school girls could use a shared environment to access FACEBOOK™ cooperatively from multiple different windows with their friends or to temporarily share recent photos and videos with their trusted group of friends without making them permanently available elsewhere, e.g. on FACEBOOK™; a group of artists could hold a public exhibition of their works where resources provided by different artists' are automatically promoted by moving them to a more central position in the environment as they receive increasing amounts of interest from visitors of the exhibition (as determined by a system according to the invention based on a measure of interest or activity derived from the number of visits to the resources, amount of time spent on the resources, amount of activity on the resources, characteristics of resource visitation patterns and/or other factors that may be indicative of the amount of interest in or activity on resources); and NBA™ fans could share an environment to keep an eye on multiple games showing live at the same time.

Figure 26:
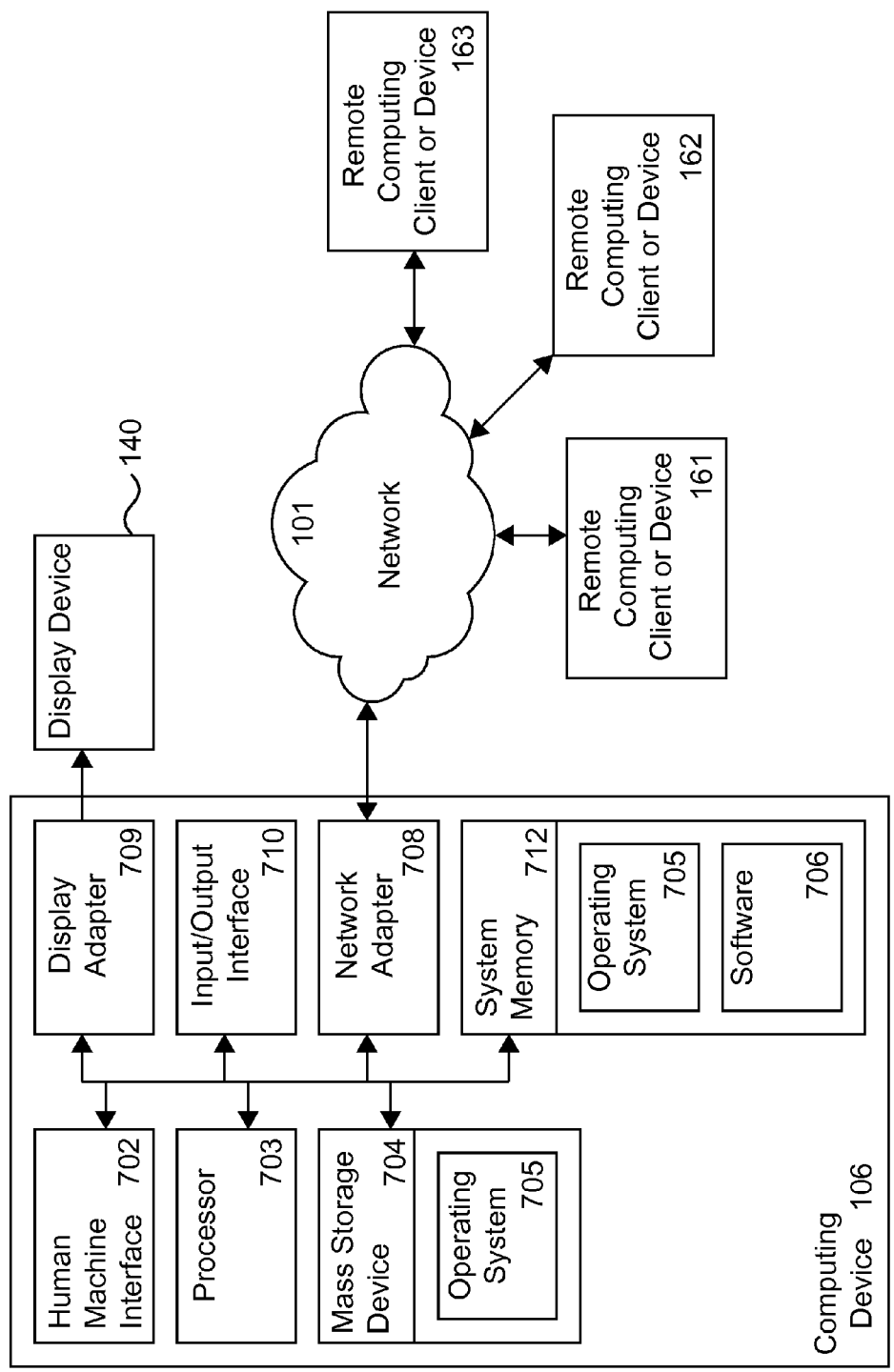
FIG. 26 illustrates a schematic block diagram of a system in which aspects of the disclosed embodiments can be implemented.

FIG. 26 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, and distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via one or more computing devices 160, such as that shown in FIG. 1. As is illustrated in FIG. 26, in one embodiment, the components of the computing device 160 can comprise, but are not limited to, one or more processors or processing units 703, a system memory 712, and a system bus 713 that couples various system components including the processor 703 to the system memory 712. In the case of multiple processing units 703, the system can utilize parallel computing.

The system bus 713 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 713, and all buses specified in this description can also be implemented over a wired or wireless network connection and each of the subsystems, including the processor 703, a mass storage device 704, an operating system 705, a network adapter 708, system memory 712, an Input/Output Interface 710, a display adapter 709, a display device 140, and a human machine interface 702, can be contained within one or more remote computing devices or clients 161, 162, 163 at physically separate locations, connected through buses of this form, in effect implementing a fully distributed system or distributed architecture.

The one or more computing devices 160 typically comprise a variety of computer readable media. Exemplary readable media can be any available media that is non-transitory and accessible by the computing device 160 and comprises, for example and not meant to be limiting, both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains data such as demand control data 707 and/or program modules such as an operating system 705 that is immediately accessible to and/or are presently operated on by the processing unit 703. In one aspect, the system memory 712 contains computer executable codes sections for performing the steps described herein.

In another aspect, the computing device 160 can also comprise other non-transitory, removable/non-removable, volatile/non-volatile computer storage media. By way of example, FIG. 26 illustrates a mass storage device 704 that can provide non-volatile storage of computer code, computer readable instructions, data structures, program modules, and other data for the computing device 160. For example and not meant to be limiting, a mass storage device 704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 704, including by way of example, an operating system 705 and other software 706. Each of the operating system 705 and software 706 (or some combination thereof) can comprise elements of the programming. Data can also be stored on the mass storage device 704. Data can be stored in any of one or more databases known in the art. Examples of such databases comprise, DB2® (IBM Corporation, Armonk, N.Y.), Microsoft® Access, Microsoft® SQL Server, (Microsoft Corporation, Bellevue, Wash.), Oracle®, (Oracle Corporation, Redwood Shores, Calif.), mySQL, PostgreSQL, and the like. The databases can be centralized or distributed across multiple systems.

In another aspect, the user can enter commands and information into the computing device 160 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the processing unit 703 via a human machine interface 702 that is coupled to the system bus 713, but can be connected by other interface and bus structures, such as a parallel port, game port, an IEEE 1394 Port (also known as a Firewire port), a serial port, or a universal serial bus (USB).

In yet another aspect, a display device 140 can also be connected to the system bus 713 via an interface, such as a display adapter 709. It is contemplated that the computing device 160 can have more than one display adapter 709 and the computing device 160 can have more than one display device 140. For example, a display device 140 can be a monitor, an LCD (Liquid Crystal Display), or a projector. In addition to the display device 140, other output peripheral devices can comprise components such as speakers (not shown) and a printer (not shown), which can be connected to the computing device 160 via Input/Output Interface 710. Any step and/or result of the methods can be output in any form to an output device. Such output can be any form of visual representation, including, but not limited to, textual, graphical, animation, audio, tactile, and the like.

The computing device 160 can operate in a networked environment using logical connections to one or more remote computing devices or clients 161-163. Although only three remote computing devices 161-163 are shown in FIG. 26, in alternate embodiments, any suitable number of remote computing devices can be implemented, including more or less than three. A remote computing device 161-163 can be a personal computer, portable computer, a server, a router, a network computer, a vendor's or manufacturer's computing device, a peer device or other common network node, and so on. Logical connections between the computing device 160 and a remote computing device or client 161-163 can be made via a local area network (LAN) and a general wide area network (WAN). Such network connections can be through a network adapter 708. A network adapter 708 can be implemented in both wired and wireless environments. Such networking environments are conventional and commonplace in offices, enterprise-wide computer networks, intranets, and other networks 101 such as the Internet. In one embodiment, the aspects of the disclosed embodiments can be implemented in a peer-to-peer (P2P) computing architecture or system.

For purposes of illustration, application programs and other executable program components such as the operating system 705 are illustrated herein as discrete blocks, although it is recognized that such programs and components reside at various times in different storage components of the computing device 160 and are executed by the data processor(s) of the computing device 160. An implementation of software including instructions for carrying out the method and processes described herein can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

As described above and as will be appreciated by one skilled in the art, embodiments of the present disclosure may be configured as a system, method, or computer program product. Accordingly, embodiments of the present disclosure may be comprised of various means including entirely of hardware, entirely of software, or any combination of software and hardware. Furthermore, embodiments of the present disclosure may take the form of a computer program product on a computer-readable storage medium having computer-readable program instructions (e.g., computer software) embodied in the storage medium. Any suitable non-transitory computer-readable storage medium may be utilized including hard disks, CD-ROMs, optical storage devices, or magnetic storage devices.

Embodiments of the present disclosure have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus, such as the one or more processors 703 discussed above with reference to FIG. 26, to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus (e.g., one or more processors 703 of FIG. 26 to function in a particular manner, such that the instructions stored in the computer-readable memory produce an article of manufacture including computer-readable instructions for implementing the functions specified. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified herein.

Accordingly, blocks of the block diagrams and illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Thus, while there have been shown, described and pointed out, fundamental novel features of the invention as applied to the exemplary embodiments thereof, it will be understood that various omissions and substitutions and changes in the form and details of devices illustrated, and in their operation, may be made by those skilled in the art without departing from the spirit and scope of the invention. Moreover, it is expressly intended that all combinations of those elements, which perform substantially the same function in substantially the same way to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A computer program product for providing a graphical user interface for displaying of and enabling cooperative use of resources on a display of a computing device, the computer program product comprising non-transitory computer readable medium containing computer executable code, the computer executable code, when executed by a processor, being configured to:

provide a desktop environment and a first viewport configured to show at least a portion of the desktop environment on the display of the computing device, and enable resources to be added to the desktop environment and to be viewed and acted upon within the first viewport, a representation of the resources being arranged in the portion of the desktop environment within the first viewport so that the resources do not substantially overlap along an X-Y plane;

provide a second viewport configured to show at least a portion of the desktop environment for display on another computing device, and enable two or more of the resources to be viewed and to be acted upon within the second viewport independently of the first viewport, a representation of the resources viewed within the second viewport being arranged in the portion of the desktop environment within the second viewport so that the resources do not substantially overlap along an X-Y plane; and enable another resource to be added to the desktop environment through the second viewport, and to be viewed and acted upon within both the first viewport and the second viewport.

2. The computer program product of claim 1, the computer executable code when executed by the processor being configured to display and enable manipulation of resources outside of the first viewport independently from display and manipulation of resources within the first viewport.

3. The computer program product of claim 1, the computer executable code when executed by the processor device being configured to provide an indication within the first viewport of a presence of and a distance to the second viewport relative to the desktop environment.

4. The computer program product of claim 1, the computer executable code when executed by the processor device being configured to enable the first viewport to be moved from a first position on the display of the computing device to a second position on the display.

5. The computer program product of claim 1, the computer executable code when executed by the processor device being configured to resize the first viewport on the display of the computing device.

6. The computer program product of claim 1, wherein a resource comprises an application window.

7. The computer program product of claim 6, wherein the application window is configured to be maintained in a non-minimized state.

8. The computer program product of claim 1, the computer executable code when executed by the processor device being configured to determine an amount of interest towards resources in a group of resources of the desktop environment and to arrange the resources in the group of resources so that a layout of the resources reflects the amount of interest towards the resources.

9. The computer program product of claim 1, wherein the computing device is a mobile communication device.

10. The computer program product of claim 1, wherein the computing device is a tablet.

11. The computer program product of claim 1, wherein the computing device is a touch screen device.

12. A method for enabling cooperation with resources by users of respective computing devices by providing graphical user interfaces for displaying the resources on the respective computing devices, comprising:
- providing a desktop environment configured to represent resources on a display of a computing device;
- providing, for each user, a respective viewport configured to show independently of other respective viewports at least a portion of the desktop environment on a display of a respective computing device of the user;
- enabling a resource to be added to the desktop environment through any respective viewport and to be viewed and acted upon within each respective viewport; and
- for each respective viewport, automatically arranging resources in the portion of the desktop environment that is displayed within the respective viewport so that the displayed resources do not substantially overlap along an X-Y plane of the desktop environment.

13. The method of claim 12, further comprising enabling resources to be viewed and acted upon independently within the first and second viewports.

14. The method of claim 12, further comprising enabling manipulation of resources displayed on a display of a computing device outside of a viewport independently from resources displayed within the viewport.

15. The method of claim 12, comprising providing an indication within a viewport of a presence of and distance to another viewport relative to the desktop environment.

16. The method of claim 12, further comprising enabling a viewport to be moved from a first position on a display of a computing device to a second position on the display.

17. The method of claim 12, further comprising determining which resources are frequently accessed resources and which are less frequently accessed resources and positioning the frequently accessed resources toward a central position relative to other resources in the desktop environment, and positioning the less frequently accessed resources away from the central position in the desktop environment.

18. The method of claim 12, further comprising automatically repositioning or resizing resources within a viewport as new resources are added to enable the resources in the viewport to remain fully visible in the viewport.

19. The method of claim 12, wherein a resource comprises an application window.

20. The method of claim 12, wherein the application window is configured to be maintained in a non-minimized state.

* * * * *